US010614467B2

(12) United States Patent
DiPersia et al.

(10) Patent No.: US 10,614,467 B2
(45) Date of Patent: Apr. 7, 2020

(54) DISPLAYING RECOMMENDATIONS FOR SOCIAL NETWORKING SYSTEM ENTITY INFORMATION VIA A TIMELINE INTERFACE

(71) Applicant: Facebook, Inc., Menlo Park, CA (US)

(72) Inventors: Blaise Andrew DiPersia, Palo Alto, CA (US); Jeffrey Andrew Kanter, San Francisco, CA (US); Russell Eric Heddleston, San Francisco, CA (US); David Ferguson, El Dorado Hills, CA (US); Thomas Giovanni Carriero, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 387 days.

(21) Appl. No.: 15/173,952

(22) Filed: Jun. 6, 2016

(65) Prior Publication Data

US 2016/0283061 A1    Sep. 29, 2016

Related U.S. Application Data

(63) Continuation of application No. 13/625,849, filed on Sep. 24, 2012, now Pat. No. 9,377,933.

(51) Int. Cl.
| | |
|---|---|
| G06Q 30/00 | (2012.01) |
| G06F 3/0484 | (2013.01) |
| G06F 3/0482 | (2013.01) |
| G06Q 30/02 | (2012.01) |
| G06Q 50/00 | (2012.01) |

(Continued)

(52) U.S. Cl.
CPC ............ *G06Q 30/01* (2013.01); *G06F 3/0482* (2013.01); *G06F 3/0484* (2013.01); *G06Q 30/02* (2013.01); *G06Q 50/01* (2013.01); *G06F 16/447* (2019.01); *G06Q 30/0241* (2013.01); *G06Q 30/0251* (2013.01); *G06Q 30/0277* (2013.01); *H04L 67/306* (2013.01)

(58) Field of Classification Search
CPC .... G06Q 30/0629; G06Q 50/01; G06Q 30/02; G06Q 30/01; G06F 3/0482; G06F 3/0484
See application file for complete search history.

(56) References Cited

U.S. PATENT DOCUMENTS

| | | | |
|---|---|---|---|
| 7,912,900 B1 * | 3/2011 | Lippert | G09B 7/00 709/204 |
| 8,180,804 B1 * | 5/2012 | Narayanan | G06F 16/9535 707/798 |

(Continued)

*Primary Examiner* — Justin R. Blaufeld
(74) *Attorney, Agent, or Firm* — Fenwick & West LLP

(57) ABSTRACT

A social networking system displays information about a user via a timeline included in a profile page. Narrative data about a user stored in a social networking system, including data about the user and social network activities related to the user is accessed. Timeline units summarizing information about the user are generated from the narrative data. When a viewing user requests a profile page, timeline units are displayed based information related to the viewing user and interactions with the profile page by other users connected to the viewing user. Users that administer the profile page are presented with additional information when viewing the profile page, allowing the administering users to modify appearance of the timeline or to identify actions for an administering user to take to increase interaction with the profile page.

8 Claims, 14 Drawing Sheets

(51) Int. Cl.
*G06F 3/0481* (2013.01)
*H04L 29/08* (2006.01)
*G06F 16/44* (2019.01)

(56) References Cited

U.S. PATENT DOCUMENTS

| | | | | |
|---|---|---|---|---|
| 8,356,248 | B1* | 1/2013 | Killalea | G06Q 30/0601 707/751 |
| 8,762,462 | B1* | 6/2014 | Duddu | H04L 51/18 709/204 |
| 8,775,517 | B1* | 7/2014 | Goldman | G06Q 50/01 709/204 |
| 8,903,921 | B1* | 12/2014 | Snow | G06Q 50/01 709/206 |
| 9,094,355 | B1* | 7/2015 | Duddu | H04L 51/18 |
| 9,338,242 | B1* | 5/2016 | Suchland | H04L 67/22 |
| 9,721,229 | B1* | 8/2017 | Hernandez | G06Q 50/01 |
| 2007/0214141 | A1* | 9/2007 | Sittig | G06Q 10/00 |
| 2008/0040673 | A1* | 2/2008 | Zuckerberg | H04L 67/306 715/745 |
| 2008/0154915 | A1* | 6/2008 | Flake | G06F 17/30867 |
| 2009/0163183 | A1* | 6/2009 | O'Donoghue | G06Q 30/02 455/414.1 |
| 2009/0235335 | A1* | 9/2009 | Mendiola | H04L 63/104 726/4 |
| 2010/0082376 | A1* | 4/2010 | Levitt | G06Q 10/06311 705/7.18 |
| 2010/0106573 | A1* | 4/2010 | Gallagher | G06Q 30/02 705/14.4 |
| 2010/0146443 | A1* | 6/2010 | Zuckerberg | H04L 67/306 715/810 |
| 2010/0169177 | A1* | 7/2010 | Griffith | G06F 17/3089 705/14.53 |
| 2010/0241580 | A1* | 9/2010 | Schleier-Smith | G06Q 30/02 705/319 |
| 2011/0004922 | A1* | 1/2011 | Bono | G06F 21/6263 726/4 |
| 2011/0040756 | A1* | 2/2011 | Jones | G06F 17/30864 707/737 |
| 2011/0153377 | A1* | 6/2011 | Novikov | G06Q 10/063 705/7.11 |
| 2011/0246907 | A1* | 10/2011 | Wang | G06Q 30/0224 715/751 |
| 2011/0282821 | A1* | 11/2011 | Levy | G06Q 30/0631 706/47 |
| 2012/0066196 | A1* | 3/2012 | Dempski | G06F 16/951 707/706 |
| 2012/0102114 | A1* | 4/2012 | Dunn | G06Q 10/10 709/204 |
| 2012/0253918 | A1* | 10/2012 | Marois | G06Q 30/02 705/14.39 |
| 2012/0254152 | A1* | 10/2012 | Park | G06Q 30/02 707/710 |
| 2012/0272160 | A1* | 10/2012 | Spivack | G06Q 10/10 715/752 |
| 2012/0323928 | A1* | 12/2012 | Bhatia | H04L 67/02 707/748 |
| 2013/0014026 | A1* | 1/2013 | Beringer | G06Q 10/06311 715/753 |
| 2013/0024511 | A1* | 1/2013 | Dunn | G06Q 10/10 709/204 |
| 2013/0166648 | A1* | 6/2013 | Allard | G06Q 30/0242 709/204 |
| 2013/0166721 | A1* | 6/2013 | Soffer | G06Q 50/01 709/224 |
| 2013/0185106 | A1* | 7/2013 | Donatone | G06Q 10/06 705/7.14 |
| 2013/0218999 | A1* | 8/2013 | Martin | H04L 51/32 709/206 |
| 2014/0019550 | A1* | 1/2014 | Whitney | G06Q 30/0201 709/204 |
| 2014/0074551 | A1* | 3/2014 | Setayesh | G06Q 10/10 705/7.29 |
| 2014/0074893 | A1* | 3/2014 | Griffin | G06F 17/30958 707/798 |

* cited by examiner

FIG. 2G

DISPLAYING RECOMMENDATIONS FOR SOCIAL NETWORKING SYSTEM ENTITY INFORMATION VIA A TIMELINE INTERFACE

CROSS-REFERENCE TO RELATED APPLICATIONS

This application is a continuation of U.S. patent application Ser. No. 13/625,849, filed Sep. 24, 2012, which is hereby incorporated by reference.

BACKGROUND

This invention relates generally to social networking and, in particular, to displaying information about entities in a social networking system.

Social networking systems capture large volumes of information from various sources. These sources include mobile devices, user posts, picture uploads, news, etc. Information stored by the social networking system will often be associated with time, location, user, and subject data. The time and location data captures temporal and geographical information related to a source while the user and subject data may capture, respectively, the identity of the author and the conceptual subjects of the information. For example, a photo of a car uploaded to a social networking system may be stored in association with a time stamp, a geographical coordinate, a subject tag (identifying the car brand in the photo) and a user identifier (identifying the user that took the photo or an entity associated with the photo). Typically, information about an entity of a social networking system is displayed through a profile page that is divided into sections, each section including different types of information pertaining to the entity. For example, an entity profile page may have separate sections identifying events and photos related to the entity.

However, as the social networking system accumulates information about an entity over time, the limited display space of the profile page makes it difficult for the social networking system to organize information about the entity. Because of the information accumulated by the social networking system about an entity, the entity's profile page may make it difficult for users to access older information about the entity. For example, fans of a musician may wish to view information related to that musicians earliest albums and performances, rather than his latest work, which is typically more readily accessible via a profile page.

Efficient storage of the information about an entity allows the social networking system to enhance user interactions. Because of the large amount of information captured by the social networking system, use of compact yet informative structures to store information allows the social networking system to efficiently retrieve information for presentation to users.

Further, information associated with a time period is often related to other information associated with the time period, making it desirable to associate or display information from the time period together. For example, a social networking system user may be interested in viewing photos of a particular musician from the same time period as music released by the musician. However, if the entity's profile page displays information segmented by information type, then viewers wishing to view the music and pictures in conjunction with each other need to manually search the profile page for each type of information. This makes it difficult for a user to concurrently view different types of information related to a particular time period. Additionally, allowing an entity's profile page to provide an indication of whether an entity is spoken about, liked, or popular in its own social circles may further increase user interactions with the entity.

SUMMARY

A social networking system may present information associated with a user in a chronological timeline, allowing other users to easily review and identify actions performed by the user. For example, the social networking system maintains a profile page for each user and displays a timeline describing actions performed by, or otherwise associated with, a user on the profile page. Users of the social networking systems may be entities, such as corporations, charitable organizations, non-profit organizations, interest groups or any other entity other than an individual person. Hence, the social networking system enables entities to maintain a profile page for presenting information about the entity to other users. An entity typically identifies one or more individuals as page administrators to modify and/or customize the entity's profile page. To simplify modification of an entity's profile page, the social networking system provides one or more administrative interfaces to the page administrators.

For example, the social networking system presents a suggestion interface to page administrators viewing an entity's profile page. The suggestion interface includes one or more actions for the page administrator to increase user interaction with the profile page or to improve user sentiment towards the entity associated with the profile page. For example, the social networking system analyzes interactions between users and the profile page and recommends actions to the page administrator based on the interactions. As an example, the social networking system may analyze posts to the profile page by other users and identify posts indicating negative sentiment towards content associated with the profile page; the social networking system may suggest that the page administrator message or otherwise contact users associated with the posts indicating negative sentiment. By suggesting actions, the social networking system reduces time spent by page administrators analyzing interactions with the profile page.

Additionally, the social networking system allows page administrators to modify the content of a timeline on an entity's profile page. For example, action shortcuts are displayed along with timeline units when a page administrator views the entity's profile page. Accessing an action shortcut allows a page administrator to remove a timeline unit from the timeline, modify the location of a timeline unit on the timeline or otherwise modify attributes of a timeline unit. A page administrator may "pin" a timeline unit to a location on the timeline to make the timeline unit more visible or more accessible by remaining in a specific location. For example, timeline units may be pinned to the beginning of the timeline so that they appear before a timeline unit associated with an earliest time.

In addition to allowing page administrators to modify an entity's profile page, the social networking system may personalize a profile page for presentation to a viewing user. For example, to increase the likelihood of the viewing user interacting with the profile page, actions of users connected to the viewing user with respect to the profile page are identified by the profile page. For example, the profile page includes a friend user interface where actions performed by users connected to the viewing user related to the profile page are displayed. This allows the viewing user to easily identify interactions with the profile page likely to be relevant to the viewing user. For example, on a band's profile page the friend activity interface displays a list of the band's songs that have been played by users connected to the viewing user and/or a list of users connected to the viewing user that are attending an upcoming band concert.

BRIEF DESCRIPTION OF THE DRAWINGS

FIGS. 2A, 2B, 2C, 2D, 2E, 2F, 2G, and 2H illustrate embodiments of various embodiments of the timeline interface.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g., "130" in the text refers to reference numerals "130A" and/or "130B" in the figures).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system generates timeline units based on data in the social networking system that is associated with entities and generates displayable representations of selected timeline units, which are dispatched to client devices for display to viewing users in a timeline interface. Selection of timeline units for display in the timeline interface may be based on a ranking of candidate timeline units, where a machine-learned model may perform the ranking. The entities may be individuals, corporations, bands, brands, events, fan groups or other non-individual organizations and/or groups.

System Overview

Figure 1:
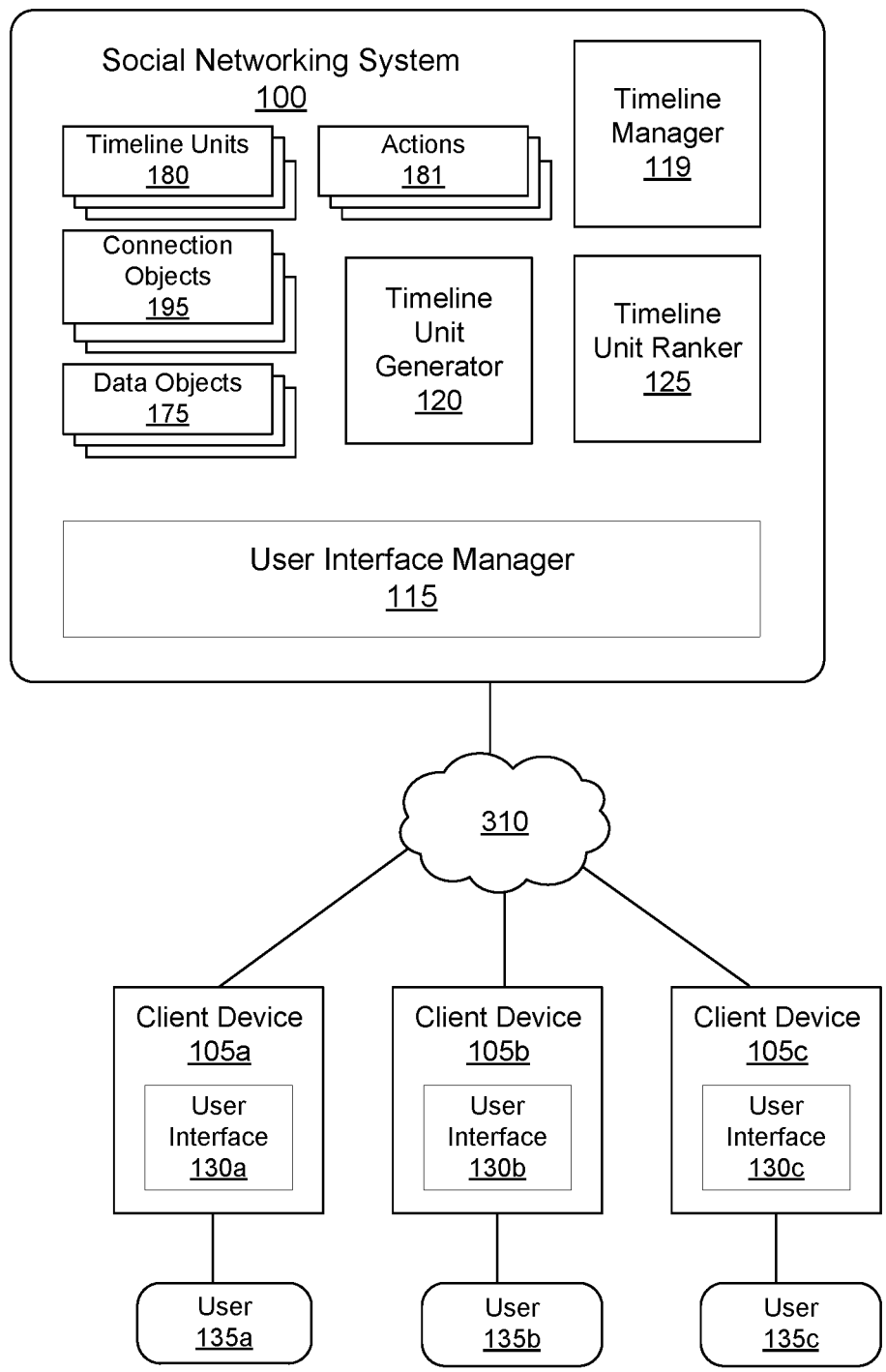
FIG. 1 is a block diagram of a system environment for a social networking system, in accordance with an embodiment of the invention.

FIG. 1 is a diagram of an embodiment of a system environment for a social networking system that presents timeline units associated with a social networking system entity. The users 135 interact with the social networking system 100 using client devices 105. Some embodiments of the social networking systems 100 and/or client devices 105 have different and/or additional modules than the ones described herein, and the functions can be distributed among the modules in a different manner than described here.

The social networking system 100 allows its users to communicate and interact with other users of the social networking system 100. Users 135 join the social networking system 100 and then add connections to other users of the social networking system 100, including entities, to whom they wish to be connected. When a user joins the social networking system 100, the user creates a user account, which allows the user to maintain a persistent and secure identity on the social networking system 100. The user account includes a user profile storing details about the user, such as name, age, sex, etc.

When the user performs an action via the social networking system 100, the action is performed via the user account rather than the user (the human being) controlling the user account. For example, a user "creates a connection" with another user in the social networking system 100, a connection between the user accounts of the two users is created by the social networking system 100. Users may also create and configure profile pages to present their information on the social networking system 100. Profile pages may be created for individuals or for other entities such as corporations, non-profits, fictional characters, brands, musicians, events, etc. Individual users may add connections to profile pages for entities or to profile pages for other individual users. The users that are connected to an entity's profile page are sometimes called "friends," "connections," "fans," or "customers" of that entity or of the entity's profile page.

One or more individual users associated with an entity are authorized by the entity to create, modify or otherwise administer the entity's profile page. The users administering an entity's profile page are called the page administrators. A page administrator is given greater access to a profile page's configuration settings and information than other users of the social networking system. In one embodiment, a user that creates a profile page is made the page administrator for that profile page, and that user may identify other page administrators to the social networking system 100. When an individual user creates an account on the social networking system 100, a profile page for the user may be automatically created with the individual user automatically identified as the page administrator of its profile page.

A client device 105 is any device having data processing and data communication capability. Users 135 interact with the social networking system 100 via the client device 105. Examples of a client device 105 include a personal computer (PC), a desktop computer, a laptop computer, a notebook, or a tablet PC. A client device 105 may execute an operating system, for example, a Microsoft WINDOWS®-compatible operating system (OS), Apple OS X®, and/or a Linux distribution. A client device 105 may also be any device having computer functionality, such as a personal digital assistant (PDA), mobile telephone, smartphone, etc.

Interactions between the client devices 105 and the social networking system 100 are typically performed via a network 310, which enables communications between client devices 105 and the social networking system 100. In one embodiment, the network 310 uses standard communications technologies and/or protocols. Thus, the network 310 may include communication channels using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 310 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. Data exchanged over the network 310 may be represented using technologies and/or formats such as the hypertext markup language (HTML), the extensible markup language (XML), etc. In addition, all or some of communication channels comprising the network 310 may be encrypted using conventional encryption technologies such as secure sockets layer (SSL), transport layer security (TLS), virtual private networks (VPNs), Internet Protocol security (IPsec), etc. In another embodiment, the client devices 105 and social networking system 100 use custom and/or dedicated data communications technologies instead of, or in addition to, the ones described above. Depending upon the embodiment, the network 310 can also include links to other networks, such as the Internet.

A client device 105 executes a user interface 130 to allow a user 135 to perform various actions associated with the social networking system 100 and to view information provided by the social networking system 100. Examples of actions performed using the user interface 130 include adding connections to profile pages, creating profile pages, viewing profile pages, administering profile pages, etc. Examples of information provided by the social networking system 100 for viewing using the user interface 130 includes images, videos, links, wall posts, "likes," comments and other content posted by users. The user interface 130 provides information to page administrators identifying interactions with an associated profile page. For example, the user interface 130 identifies interactions with a profile page, such as fan messages sent to a profile page, statistics, fan sentiment analysis, etc., to a page administrator. In an embodiment, the user interface 130 is presented to the users 135 via a browser application that allows a user to retrieve and present information from the internet or from a private network. In another embodiment, the user interface 130 is a mobile app running on a mobile device such as a smart phone or tablet. In yet another embodiment, the user interface 130 is an application running on a desktop or laptop computer.

The user interface 130 allows users 135 to view the data related to users, including entities, stored by the social networking system 100; this stored data may be presented to users by way of "profile pages." A profile page is an arrangement of social networking system data related to an individual user or to an entity (for example a company, a product, etc.). In one embodiment, a profile page comprises data and code in a web standard format presented through a browser. For example, the profile page may consist of a combination of any of XML, HTML, cascading style sheets (CSS), JAVASCRIPT®, plaintext and JAVA® sent from a server of the social networking system 100 to a web browser running on a client device 105. In another embodiment, a profile page comprises data formatted for presentation through a mobile app or desktop application. When a user "A" views the profile or data of another user "B," which may be an individual user or an entity, the user "A" is called the "viewing user," and the entity "B" is called the "subject entity." The user interface 130 allows a viewing user to explore information about a subject entity via a timeline interface generated by the timeline manager 119, further described herein. The timeline interface may present a viewing user with the information of a single subject entity, or it may present the viewing user with the data of several subject entities.

The social networking system 100 maintains different types of data, for example, data objects 175, connection objects 195, and objects representing timeline units 180 and actions 181. A data object 175 stores information related to an individual user or other entity of the social networking system 100. For example, a data object associated with an individual user stores a user's date of birth, stores a photo of the user, stores a reference to a photo of the user. Similarly, a data object associated with an entity stores information related to the entity. For example, a band data object stores a band's information, such as tour dates, band photos, discography, links to music and videos, etc. A connection object 195 stores information describing the relationship between two objects stored in the social networking system 100. An action object 181 stores information related to actions performed by entities or individual users of the social networking system 100. Almost any activity of a user of the social networking system 100 may be stored as an action. For example, an action may be the posting of a new comment or status update or it may be forming a connection to an entity. In one embodiment, actions performed by page administrators of an entity's profile page are recorded in action objects that identify both the page administrator and the entity; the social networking system 100 may consider actions performed the page administrator of an entity's profile page as performed by the entity.

The social networking system 100 maintains a social graph that tracks the relationship between the various objects, actions, connections, users, and entities stored by the social networking system 100. In the social graph, individual users, entities, and other objects are represented as nodes that have edges to other nodes. The edges represent actions or connections that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing social networking system connections (friends) of that user. These edges may indicate the relationship between the user and its social networking system connections. The edges in the social graph can have different types that correspond to the different types of actions and connections in the social networking system 100.

The social networking system 100 may maintain or compute a measure of an object's "affinity" for other objects in the social networking system 100. An object may be an individual user, an entity or other content stored by the social networking system 100. The measure of affinity may be expressed as an affinity score representing an object's closeness to another object of the social networking system 100. The affinity score of a user X for an entity Y can be used to predict, for example, if user X would be interested in viewing or likely to view information related to entity Y. The affinity scores can be computed by the social networking system 100 through automated methods, including through predictor functions, machine-learned algorithms, or any other suitable algorithm for determining user affinities. The social networking system 100 may store an archive of historical affinity scores for objects as their affinity scores for various other objects changes over time. Computation of affinity scores is further disclosed in U.S. application Ser. No. 12/978,265, filed on Dec. 23, 2010, which is hereby incorporated by reference in its entirety.

A timeline unit 180 includes data and/or actions related to an individual user or to an entity from a particular time period and is used to aggregate entity data/actions for presentation on a timeline. In one embodiment, a timeline unit 180 includes data and/or actions related to a single entity. Alternatively, a timeline unit 180 includes data and/or actions common to two or more entities. A timeline unit 180 may include a single action or a single piece of data and/or a single action, or it may include multiple actions and/or data that are related in some way. For example, photos and status updates from a single event may be grouped into one timeline unit. In one embodiment, a timeline unit is "displayed" by generating a displayable representation of the data contained in the timeline unit that is sent to a client device 105 for rendering as part of the user interface 130. The data objects 175, connection objects 195, timeline units 180 and actions 181 are described in more detail herein.

The social networking system 100 also comprises a user interface manager 115, a timeline manager 119, a timeline unit ranker 125, and a timeline unit generator 120. The user interface manager 115 allows users of the social networking system 100 to interact with the social networking system 100 via the user interface 130 and manages presentation of information to a user. Depending on the type of information being displayed to a user, the user interface 130 may display a timeline generated in association with the timeline manager 119. In one embodiment, the timeline is a visualization of an individual user's or an entity's social networking system information that is displayed in a navigable chronological sequence. In another embodiment, the timeline is a visualization of multiple entities' common social information displayed in a navigable chronological sequence. For example, a timeline interface displayed on a profile page includes timeline units based on information related to actions performed with the profile page by the viewing user and by the viewing user's connections.

The timeline unit generator 120 generates timeline units 180 from the actions 181 and data objects 175, and the timeline units 180 are displayed on a timeline as describe above. The timeline unit ranker 125 may use criteria specified by the social networking system 100, by page administrators, or by other users to rank the timeline units 180 displayed on the timeline. For example, timeline units 180 associated with an entity are ranked based on their relevance to and/or preferences of page administrators. In another embodiment, timeline units 180 are ranked based on their relevance to and/or preferences of viewing users. In yet another embodiment, the social networking system 100 sets ranking criteria for the timeline units. The timeline unit ranker 125 may use scores for timeline units 180 generated by machine-learned models when ranking. The timeline manager 119 selects timeline units 180 generated by the timeline unit generator 120 and sends them, or a displayable representation of them, to the client device 105. The timeline units are converted to a displayable representation—if not already in such a form—and are displayed in a timeline interface by the client device 105. The timeline manager 119 may use the ranking provided by the timeline unit ranker 125, page administrator curation, user curation, or a combination of these when selecting timeline units 180 for display in the timeline interface.

System Details

Figure 3:
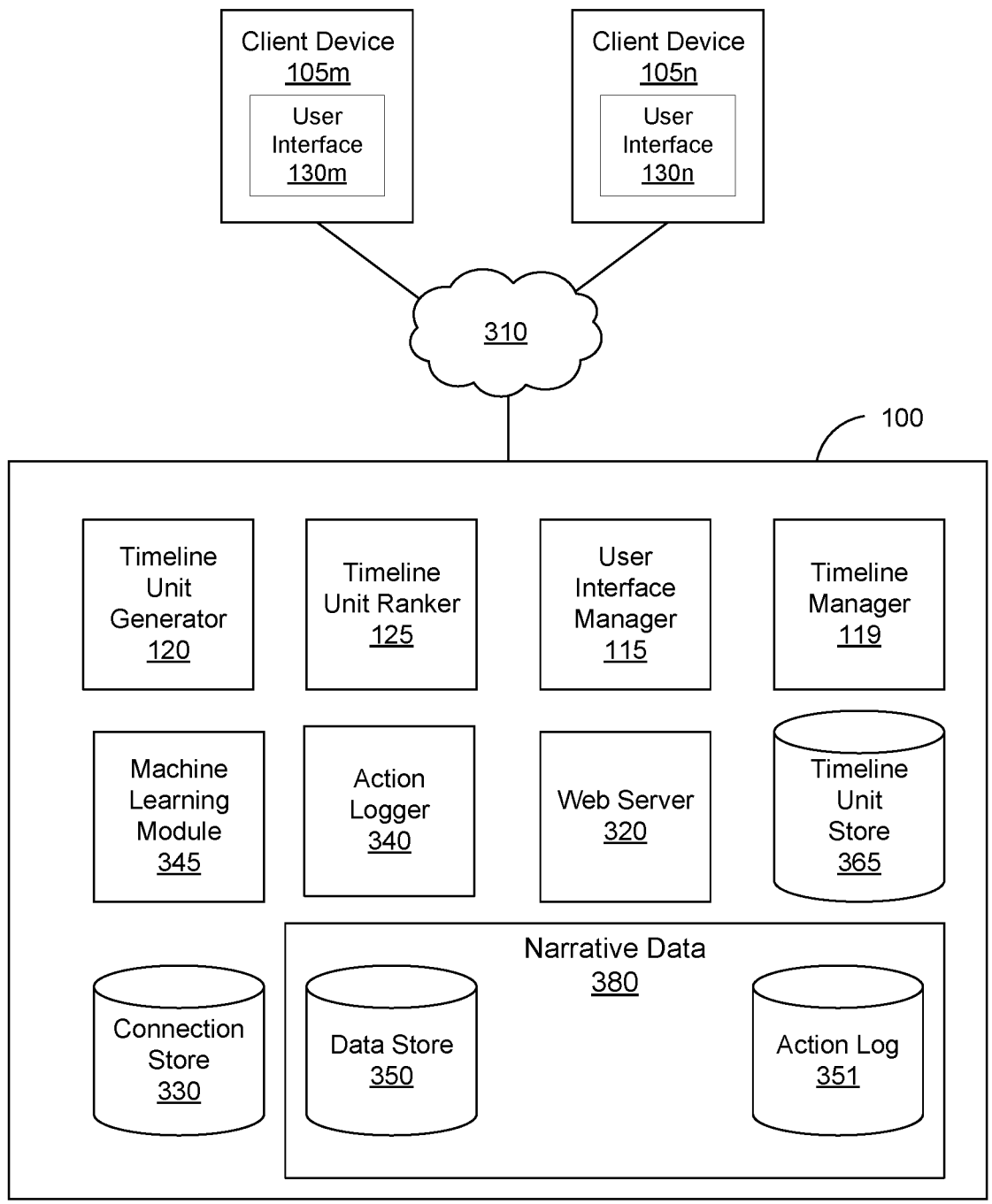
FIG. 3 is a diagram of the system architecture of a social networking system for generating timeline units that may be visually presented to users, in accordance with an embodiment of the invention.

FIG. 3 is a diagram of the system architecture of a social networking system 100, in accordance with an embodiment of the invention. The social networking system 100 includes a web server 320, a user interface manager 115, a timeline manager 119, an action logger 340, an action log 351, a data store 350, a connection store 330, a machine-learning module 345, a timeline unit store 365, a timeline unit generator 120, and a timeline unit ranker 125. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 stores data objects 175 in the data store 350. The information captured in the data objects includes descriptive information, and other information relating to individual users and entities of the social networking system 100. For example, data objects associated with an individual user includes information such as age, work experience, educational history, interests, gender, sexual preferences, hobbies or preferences, location, income, languages spoken, ethnic background, etc. Similarly, data objects associated with an entity include various types of information relevant to entities of various types. For example, discography information for musicians, product photos for companies, event information for entities of different types, promotional videos for brands, trailers and cast photos for movies, etc. Information in the data objects may also include information captured by third-party applications that interface with the social networking system 100. Examples of information captured by third-party applications include status updates from social applications, high scores posted from game applications, and music played in media applications.

Information about an individual user or an entity stored as data objects 175 may be explicitly provided by a user or by a page administrator or may be inferred from actions and/or other data of the social networking system 100. For example, interests of a user can be inferred from the type of content accessed by the user. As another example, the sentiment of a user comment on an entity profile page may be inferred by analyzing the text content of the comment.

The data store 350 may store other types of data related to entities and individual users, for example, images, videos, documents, likes, comments, status updates, uniform resource locator (URL) links, etc. Images and video including content related to entities may be tagged with the identification information of the entities. For example, a video of a musician in a band may be tagged with the identifier of both a data object associated with the musician as well as a data object associated with the band. Similarly, an image of a product may be tagged with the identifier for a data object associated with the company that makes the product.

The connection store 330 stores connection data describing connections between different data objects stored in the data store 350. In one embodiment, the connection data is represented as connection objects 195. Connections describe relationships between individual users, entities and other objects in the social networking system 100. Individual users and/or page administrators specify the relationships between individual users, entities, and other objects stored by the connection store 330. For example, connections allow individual users and page administrators to establish relationships with other individual users and/or entities that parallel real-life relationships between individual users and entities. Examples of connections describe relationship such as an individual user being friends with another individual user, an individual user being employed by an entity, an individual user being a fan of an entity. A connection is associated with a connection type identifying the type the type of relationship represented. Examples of connection types include family, friend, colleague, fan, customer, etc. Users and page administrators may select from predefined types of connections, or define their own connection types as needed.

Connections may be added explicitly or inferred by the social networking system 100 based on existing data. Connections in social networking system 100 are usually in both directions, but need not be, so the terms "connection" and "friend" depend on the frame of reference. For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections. For example, the social networking system 100 may infer a connection between individual users that listen to a particular song and an entity representing the band that played the song.

The web server 320 links the social networking system 100 via the network 310 to one or more client devices 105; the web server 320 serves web pages, as well as other web-related content, such as FLASH®, XML, and so forth. The web server 320 receives and routes messages between the social networking system 100 and the client devices 105 as well as other external systems. These messages may be instant messages, queued messages (e.g., email), text and SMS (short message service) messages, or any other suitable messaging technique. In some embodiments, a message sent by an individual user to an entity profile page (or vice versa) may be viewed by other users of the social networking system 100. The users capable of viewing the message may be limited. For example, the message may be accessible by connections of the entity associated with profile page receiving the message rather than accessible to all users. Alternatively, all social networking system users may be able to view the message. For example, a wall posting to the entity page may be viewable by users of the social networking system 100 in addition to its recipient.

The action logger 340 receives communications from the web server 320 about user actions on and/or off the social networking system 100. The action logger 340 populates the action log 351 with information about user actions, allowing the social networking system 100 to track its users' actions. When a user performs actions using the social networking system 100, action logger 340 adds entries to the action log 351, referred to herein as "actions." Any action taken by users with respect to other users (individual users or entities), is associated with the objects taking the action and the object on which the action was taken by an action 181 stored in the action log 351. Examples of actions include adding a connection to an entity profile page, posting a message to an entity profile page, posting a photo including objects connected with an entity, accepting an invitation to an event hosted by an entity, etc. Some actions may be taken by users while not connected to the social networking system 100, and these actions may be logged by a local application and transmitted to the social networking system 100 when a connection is established.

The data stored in the data store 350 and the actions 181 stored in the action log 351 are collectively called the narrative data 380, which is used for building timeline units for users and other entities. Narrative data 380 may be associated with a time and a location. In one embodiment, the time and location associated with the narrative data 380 is the time and location when and/or where the social networking system 100 captured the user data or action. In another example, the time and location indicate the creation of a particular piece of user data or the occurrence of a real world event. An item of narrative data 380 may be associated with multiple times and locations. For example, a photograph of a band may be associated with the time and location that photograph was taken as well as the time and location that photograph was uploaded into the social networking system 100. In one embodiment, the narrative data 380 is represented by nodes in a social graph including data (such as image data, text data, video data) and connections that connect the nodes to other nodes, such as those representing individual users and/or entities associated with the narrative data.

The timeline unit generator 120 generates timeline units 180 from narrative data 380 that are used by the timeline manager 119 to display a timeline interface. In one embodiment, the timeline unit generator 120 selects items from the narrative data 380 that are associated with a single subject (e.g., an individual user or other entity) to generate timeline units 180 for constructing a timeline for that subject. In another embodiment, the timeline unit generator 120 selects items from the narrative data 380 that are associated with multiple subjects and generates timeline units 180 for generating a common timeline for the multiple subjects. In one embodiment, the timeline unit generator 120 generates timeline units 180 prior to receiving a request from the timeline manager 119. However, the timeline unit generator 120 may also generate timeline units 180 responsive to requests from the timeline manager 119.

In one embodiment, the timeline units 180 are represented as nodes in a social graph that have connections to other nodes representing narrative data and entities. In one implementation, timeline units 180 are a type of a more general aggregation of data to display to users called a "story." In this embodiment, timeline units 180 are a specific type of stories that are configured for display on a timeline interface. Stories can be used in contexts outside the timeline interface and are discussed in more detail herein.

A timeline unit 180 is associated with a distinct time period, and is generated from narrative data 380 associated with that time period. Typically, a timeline unit 180 includes narrative data 380 from a single time period. For example, a timeline unit 180 includes narrative data 380 for the month of January 2010 but would typically not include narrative data from another month. However, various timeline units 180 may have different granularities of time periods. For example, different timeline units 180 include data for different length time ranges, such as days, weeks, months, and years. Timeline units 180 for the year 2010 may include some overlapping narrative data 380 with timeline units 180 for individual months in 210, as those time periods overlap.

In one embodiment, a timeline unit 180 for a time period is generated from narrative data 380 over the entire range of that time period. This allows the timeline unit 180 to simplify access to types or groups of narrative data 380 associated with the time period. For example, a single timeline unit for the month of January 2010 may be generated from photographs posed by the page administrators of an entity profile page during January 2010; hence, the timeline unit 180 may be used to access the entity's photos for January 2010.

In another embodiment, a timeline unit 180 includes a few items of narrative data clustering around a single time within the time period. For example, a timeline unit 180 for January 2010 may be generated for a band's concert in a particular city s on a particular day in January 2012; this timeline unit may include photos, status updates, and public messages received by the band's profile page during the concert. As another example, a timeline unit 180 may be generated from a single item of narrative data, which may correspond to an event or to data significant to a user. For example, a band releases a new album on Jan. 25, 2010, and a single timeline unit 180 is generated for this release on that date.

The timeline units 180 may be sent to a client device 105, either directly or after conversion to a displayable form, where they are used by the client device 105 to display representations of the selected items of narrative data. In one embodiment, the timeline units 180 are displayed via a timeline interface as part of the user interface 130. The timeline unit generator 120 may obtain the information describing the selected narrative data from the action log 351 and data store 350, or it may obtain this information directly from other modules, such as the action logger 340, the user interface manager 115, or other modules that implement functionality for performing different types of actions and collecting different types of data.

When converted to a displayable form, the timeline units 180 may display a transformed representation of and/or a subset of the information in the narrative data 380 from which the timeline units 180 were generated. For example, when a timeline unit 180 generated from entity profile page photos in January 2010 is converted to a displayable form, a subset of the photos from that month are included in the displayable form, and the subset of the photos may be displayed in a reduced-size thumbnail format. In another example, a timeline unit 180 created from blog entry posted by an page administrator of an entity's profile page is reduced to a short summary with a link to the full post, when converted to the displayable form presented on the entity's profile page.

A timeline unit 180 may include multiple items of narrative data within a time period, or it may include a single item of narrative data 380. Each timeline unit 180 is associated with a time and location, which are used to chronologically order multiple timeline units and/or to place timeline units on a timeline map interface. If the timeline unit 180 includes a single item of narrative data 380, the time and location associated with the timeline unit 180 is the same as that of the narrative data 380. If the timeline unit 180 includes multiple items of narrative data 380, the time and location associated with the timeline unit 180 may be computed from the times and locations associated with the items of narrative data 380. For example, the timeline unit 180 may be associated with the mean of the times of the narrative data, or it may be associated with the median of the times of the narrative data. As another example, the timeline unit 180 may be associated with the time of the newest or oldest narrative data it includes. The location of a timeline unit 180 including multiple items of narrative data 380 may be determined, for example, by taking the geometric center point of the locations of the included narrative data 380.

Page administrators may identify certain narrative data in timeline units 180 that is not displayed in a timeline. For example, harassment towards an entity in a user comment may be hidden by page administrators of the entity's profile page. The user interface 130 receives inputs from page administrators to identify certain types of narrative data not to be shown as part of a timeline unit 180. Additionally, the timeline unit generator 120 may prevent generation of timeline units 180 including certain narrative data based on one or more policies enforced by the social networking system 100. For example, racist, sexist, or otherwise offensive comments posted to an entity's profile page may be excluded from timeline units by a social networking system policy.

Furthermore, the timeline unit generator 120 may consider privacy settings of individual users to determine whether certain narrative data of a subject user may be presented to viewing users. A subject user may set its privacy settings to limit the set of users to which certain timeline units may be shown. For example, a subject user may limit presentation of timeline units 180 including pictures tagged as including the subject user to the subject user's immediate connections; a different subject user may allow presentation of timeline units 180 including pictures tagged as including the different subject user to any social networking system user. A subject user may also individually block specific viewing users from viewing specific timeline units 180 on a unit by unit basis and user by user basis, or may block user-defined groups of viewing users from viewing certain timeline units 180. For example, a subject user may define a set of users as "co-workers" and block those users, as a group, from viewing timeline units that contain photos of the subject user. Users or groups of users blocked from viewing timeline units may similarly be given permission to view the timeline units in a user-by-user basis, a unit-by-unit basis, or a group basis.

In an embodiment, the timeline units 180 are stored in the timeline unit store 365. The timeline units 180 in the timeline unit store 365 may be represented as database entries that link various objects related to the timeline units 180. Each timeline unit 180 stored in the timeline unit store 365 may be associated with other objects in the social networking system 100. For example, a timeline unit 180 may be associated with one or more individual users, entities or other objects that performed an action described in the timeline unit 180. Individual users, entities or other objects performing an action described in a timeline unit 180 are called the "actors" for that timeline unit 180. For example, if a timeline unit 180 describes a comment posted by John on a video posted on a band's profile page, both John and the band are considered actors of the timeline unit. In the preceding example, a page administrator acts on behalf of the band to post the video on the profile page. As another example, a timeline unit 180 describing a comment posted by a user to an entity's profile page may identify both the user who posted the comment and the entity associated with the profile page as actors.

In an embodiment, the timeline unit generator 120 generates timeline units 180 that may be visually displayed without additional processing. In another embodiment, the timeline unit generator 120 generates timeline units 180 that are combined with visual templates provided by the user interface manager 115 to create displayable representations of the timeline units 180, which sent to a client device 105 for display via a user interface 130. In yet another embodiment, visual templates provided by the user interface manager 115 and the timeline units 180 are sent to the client 105, which combines the visual templates and the timeline units 180 to create a displayable representation of the timeline unit 180 for display.

The Timeline Interface

The timeline manager 119 manages presentation of individual user and entity timelines to viewing users of the social networking system 100. The user interface manager 115 may present viewing users with an option, through the user interface 130, to browse an individual user's or an entity's narrative data 380 through a timeline interface 200. Various states of an embodiment of a timeline interface 200 are shown in FIGS. 2A, 2B, 2C, 2D, and 2E. The timeline interface 200 is just one display option of the user interface 130, which may allow users to interact with and view narrative data 380 through other display options. For example, a viewing user may view and interact with narrative data using a timeline map interface as illustrated in FIG. 2H or using an action log as illustrated in FIG. 2G.

Figure 2A:
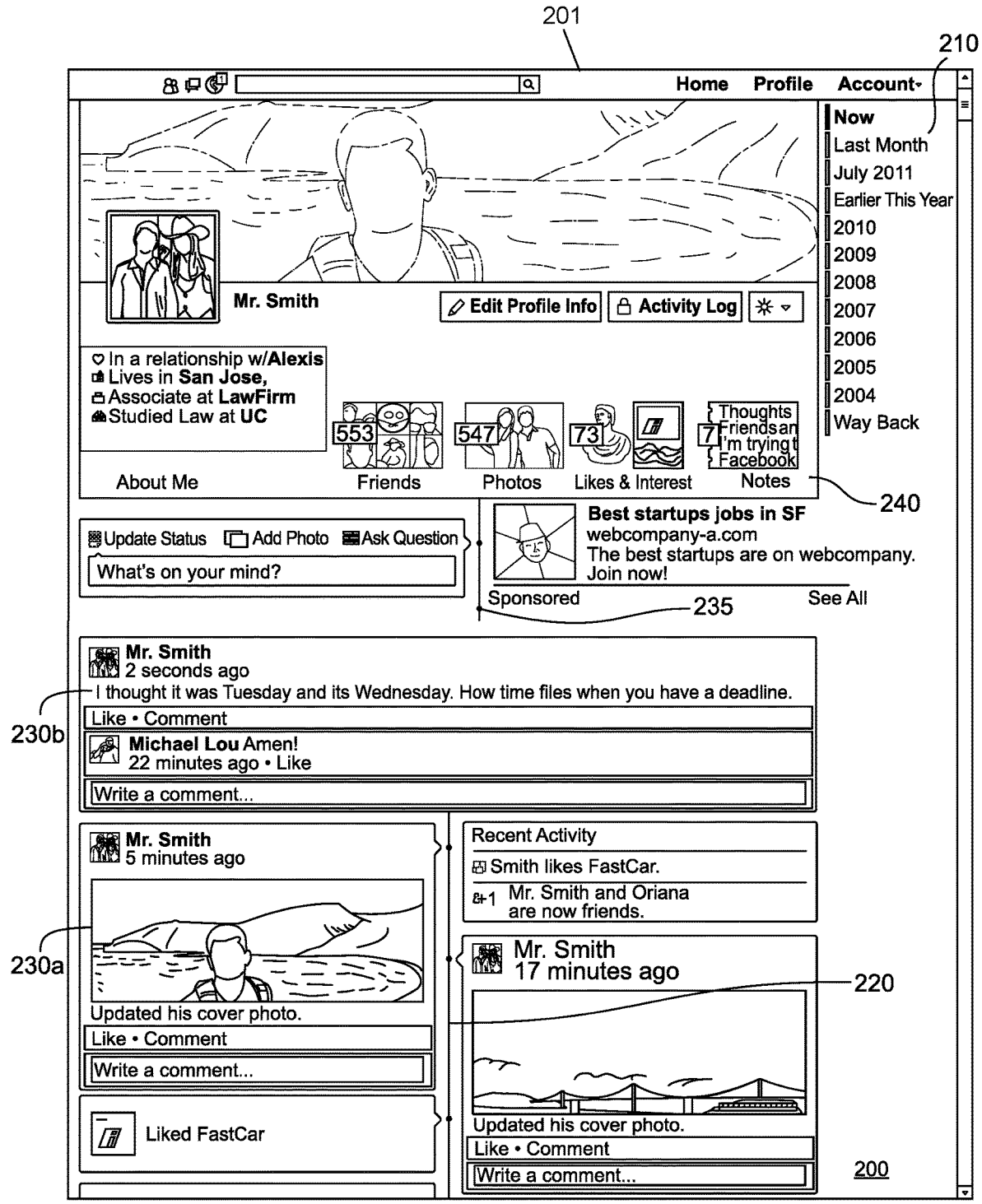
Figure 2B:
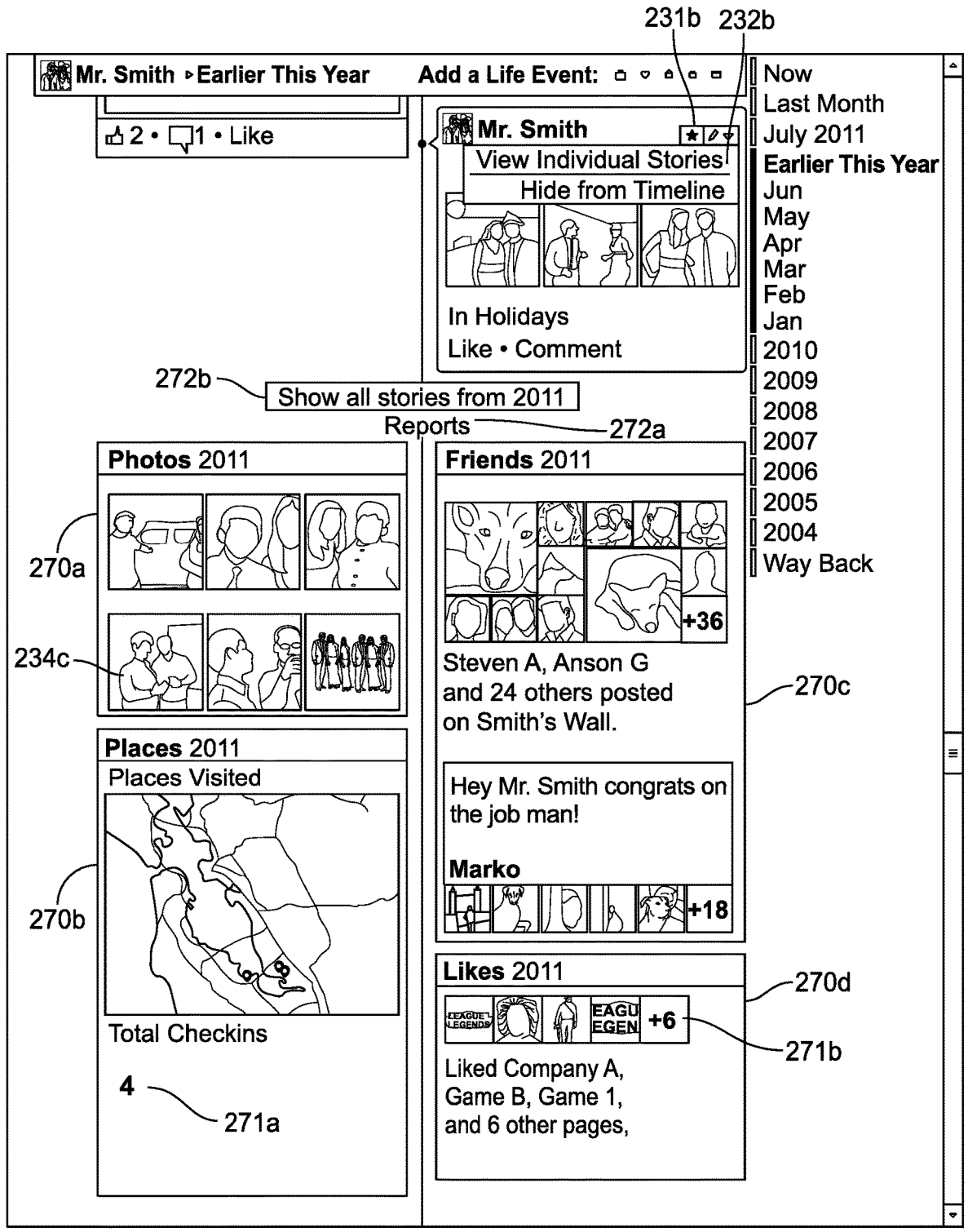

The timeline interface 200 (including all its components such as the timeline, timeline units, etc.) may be displayed as part of an entity's profile page 201 as shown in FIG. 2A. Alternatively, the timeline interface 200 may be an independent display or even an independent application running on a client device 105. The timeline interface 200 includes a time period selector 210, a timeline 220, and visual representations of the timeline units 230 that have a timeline marker 235 on the timeline 220. The timeline interface may also include a title box 240, one embodiment of which is illustrated in more detail in FIG. 2F.

Additionally, the profile page 201 may include administration displays and user interfaces for page administrators of the profile page 201. The administration displays and interfaces are not shown explicitly in FIG. 2A, but present information and options to administrators for managing interactions between viewing users and the profile page 201. The user interface manager 115 determines whether a viewing user is a page administrator, based on information in the viewing user's user profile, and limits presentation of administration displays and user interfaces to page administrators for a profile page. Examples of information included in an administration display include: the most recent messages received from users accessing the profile page, suggestions of users to connect to the profile page (e.g., suggestions for "friends" or "fans" of the profile page), notifications of recent activity by users that are connected to an entity associated with the profile page, statistics indicating the number of users accessing the profile page, statistics showing user interaction with content posted to the profile page, and sentiment analysis of recent user interaction with the profile page. Examples of administration user interfaces include: interfaces for creating advertisements for the profile page, interfaces for viewing insights to increase user interaction with the profile page, interfaces for banning users from the profile page, interfaces for granting and/or removing administrator rights, interfaces for sending messages to users, interfaces for creating events and/or inviting users to events, and interfaces for creating posts and/or for highlighting posts.

The administration information displays may be customized for specific types of entities, so that information relevant to a specific type of entity is included in an administration information display. For example, administration information displays may be customized for administrators of musician pages, product pages, company pages, charity pages, etc. For example, a page administrator of a band's profile page may be shown a customized administration information display showing the number of times a specific music track by the band has been played or shared by users connected to the band's profile page.

The timeline manager 119 determines the time periods to display to a viewing user based on a request from the viewing user, and generates timeline units 180 for the displayed time periods, or selects pre-generated timeline units 180 associated with the subject entity from the timeline unit store 365 for the displayed time periods. The timeline manager 119 may present viewing users with a predefined time period selector 210 (as illustrated in FIG. 2A) or may allow viewing users give users to define a time period to view. Hence, the displayed time periods may have a length specified by the viewing user rather than fixed by the timeline manager 119.

Figure 2C:
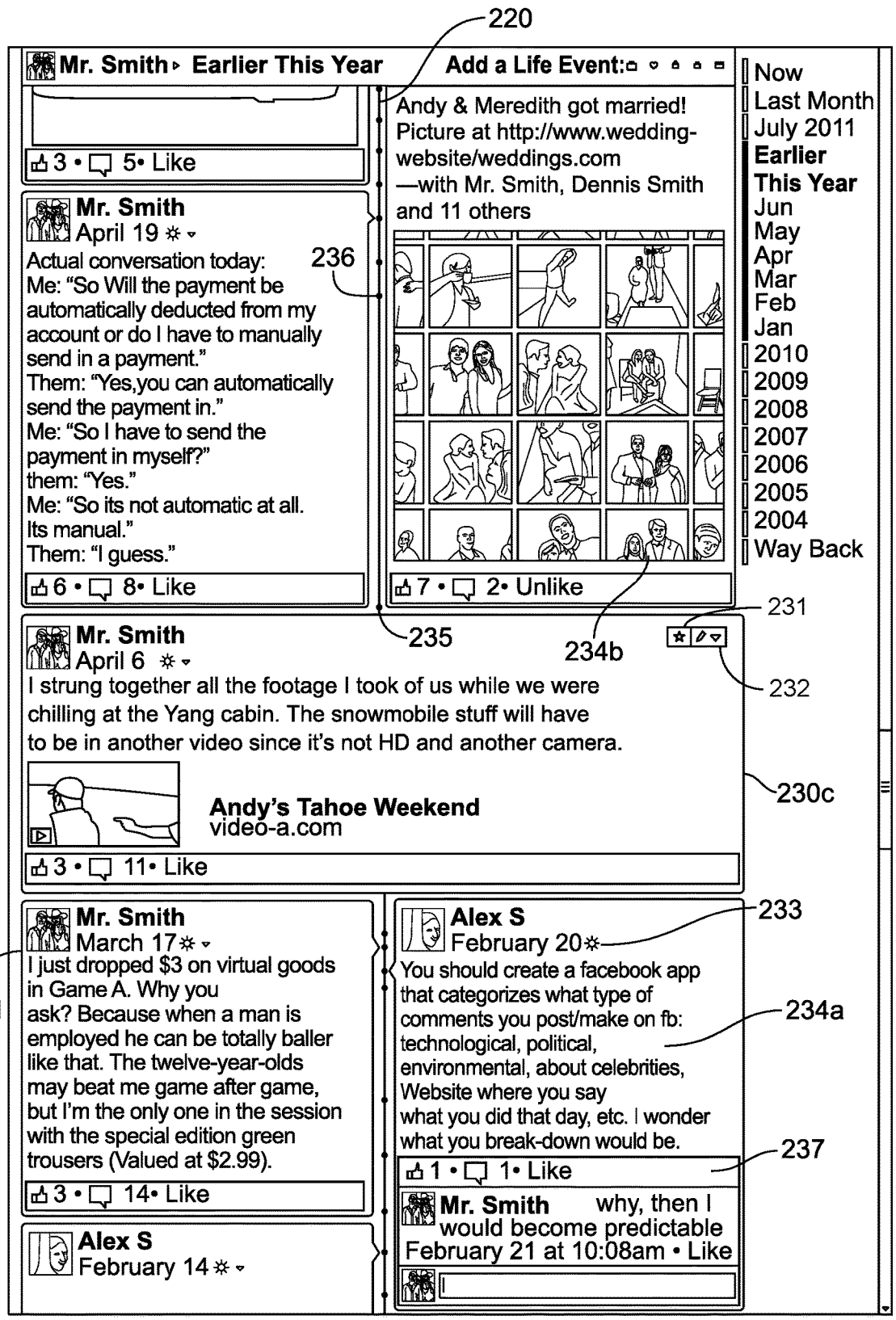
Figure 2D:
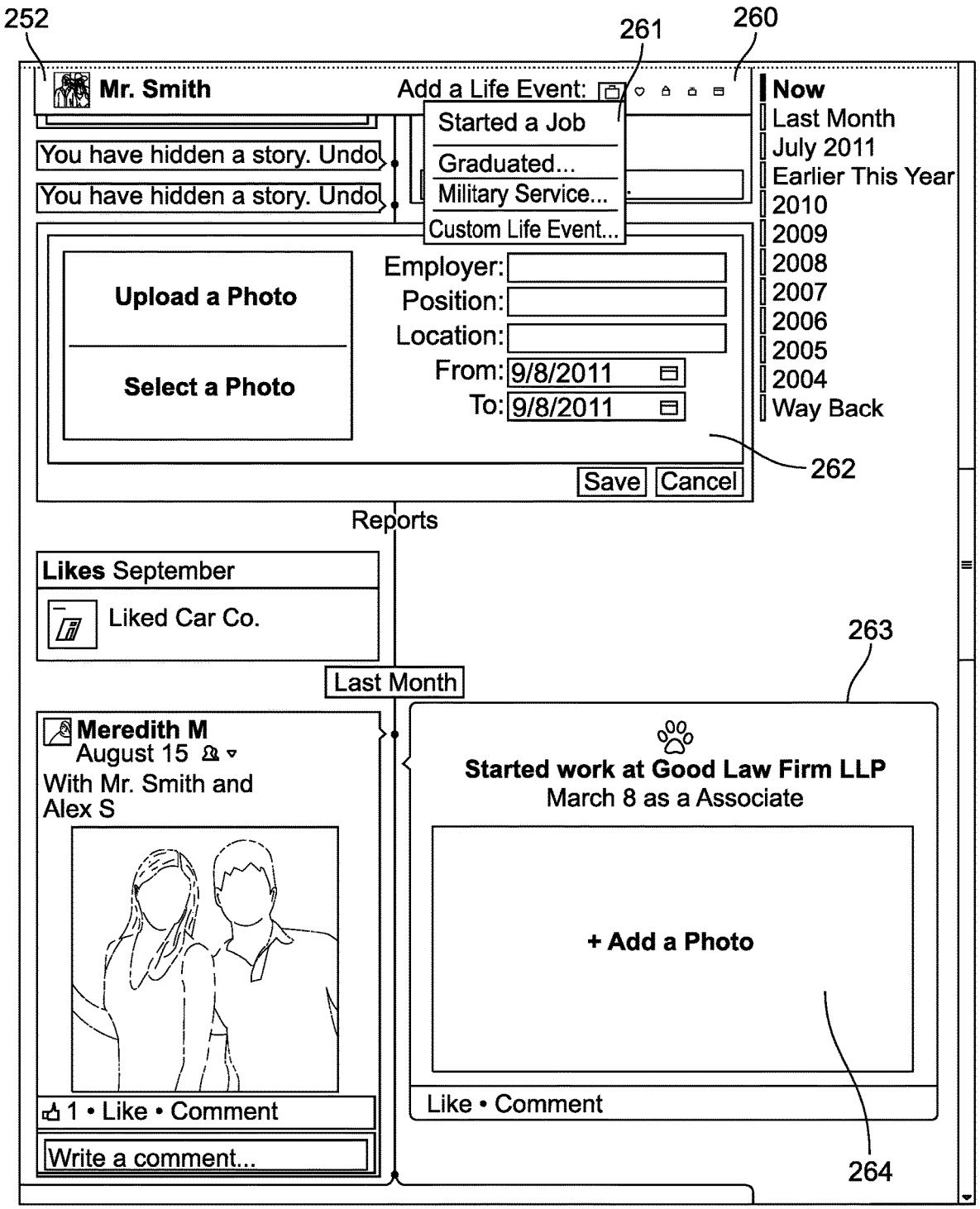

Once a viewing user selects a time period for viewing, the timeline manager 119 generates a timeline interface 200 including renderings of timeline units from the time period on the timeline 220. The timeline 220 is a visual representation of the subject entity's narrative data 380 over time. FIG. 2C illustrates one embodiment of the timeline 220 where timeline units 230 are displayed in two columns on either side of the timeline 220. Timeline markers 235 are displayed on the timeline 220 to show the position of timeline units 230 associated with the timeline markers 235 on the timeline 220.

Figure 2E:
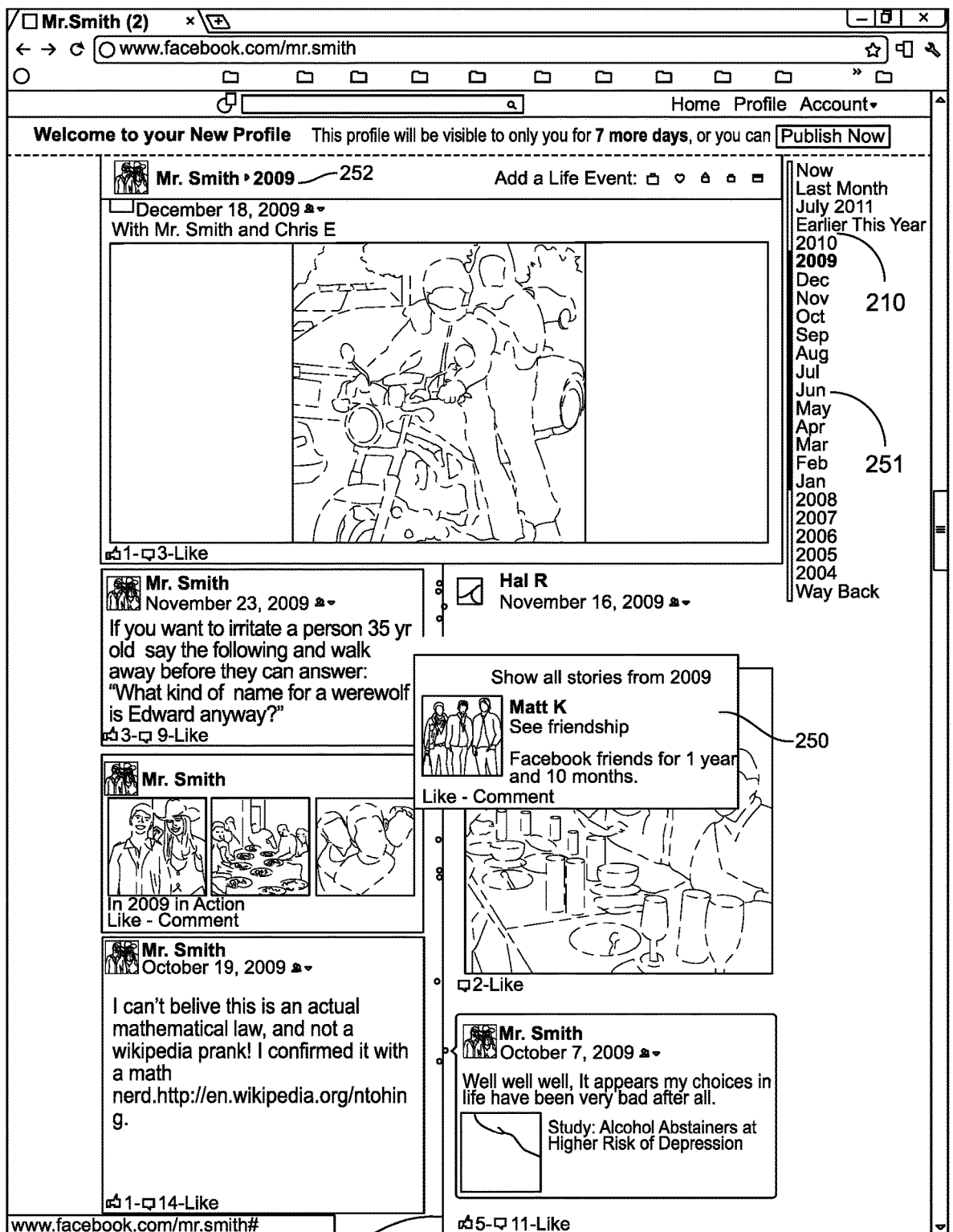

In an embodiment, the timeline 220 does not fully display all the timeline units 230 for a given time period. However, the timeline units 230 that are not fully displayed are associated with timeline markers 235 on the timeline 220. Timeline markers associated with timeline units 230 that are not fully displayed are referred to as "muted markers" 236 that are visually distinguishable from other timeline markers 235. For example, muted markers 236 may be "grayed out", lightened, or de-emphasized in another way in order to distinguish them from timeline markers 235 associated with displayed timeline units 230 ("active markers"). When a viewing user interacts with a muted marker 236, for example by moving a mouse-cursor over it, the timeline unit associated with the muted marker 236 may be displayed in a pop-up 250, as illustrated in FIG. 2E. The timeline manager 119 may allow a page administrator of an entity's profile page (or a viewing user) to permanently maximize a muted timeline unit by clicking a "maximize" or "show" input region, such as a button, on the displayed timeline unit pop-up 250. The showing or maximization of a muted timeline unit cause the timeline manager 119 to subsequently display the same timeline unit (or similar timeline units). In one embodiment, data describing timeline units maximized or shown is used by the timeline unit ranker 125 to modify ranking and selection of timeline units based on preferences of a page administrator or of a viewing user. The ranking and selection process is described in more detail herein.

As illustrated in FIG. 2C, the visual representations of the timeline units 230 may have distinct visual elements such as a header 233 identifying the individual user or entity posting the narrative data included in a displayed timeline unit 240. For example, the header 233 displays a name and/or thumbnail picture associated with the entity or individual user associated with the timeline unit 230. The header 233 may also include a date when the narrative data was uploaded or created on the social networking system 100. Further, a visual representation of a timeline unit 230 may also include a "pin" or "star" shortcut button 231 for profile page administrators. The star shortcut button 231 allows a page administrator to modify the display and/or position of the timeline unit 230. For example, accessing the star shortcut button 231 causes the corresponding timeline unit 230 to become more prominently displayed. In the example of FIG. 2C, the visual representation of a timeline unit 230c is enlarged when the star shortcut button 231 in the visual representation of the timeline unit 230c is accessed. As shown in FIG. 2C, the visual representation of the timeline unit 230c is overlaid on top of the timeline 220 and resized to occupy both sides of the timeline, while other timeline units 230d are limited in size to occupy either the left side or the right side of the timeline 220). The visual representation of a timeline unit 230 may also include an options shortcut menu 232 having additional user configuration options such as options to hide a timeline unit 230, to share a timeline unit 230 with another the social networking system user, and/or to split a timeline unit 230 into smaller timeline units 230 based on individual narrative data, etc.

In one embodiment, a page administrator activates the star shortcut button 231 to "pin" the timeline unit 230 to the top of the timeline 220. Pinning a timeline unit 230 places it at the top of the timeline 220 regardless of the time period selected a viewing user. This allows a page administrator of an entity's profile page to highlight specific content for all users viewing the profile page. For example, a company may pin photos of its latest product releases to the top of the timeline 220, bands may pin content related to their upcoming concerts and album releases to the top of the timeline 220, groups may pin announcements for their fans and members to the top of the timeline 220, etc. The social networking system 110 stores data identifying timeline units pinned by a page administrator of an entity's profile page. When viewing users request the profile page including pinned timeline units, the social networking system 100 provides a profile page displaying a timeline 220 with the pinned timeline units featured at the top.

The visual representations of the timeline units 230 may also include a narrative data summary 234. The narrative data summary 234 is a distillation of the narrative data used to generate the timeline unit 230, and may not include all the narrative data used to generate the timeline unit 230. The timeline manager 119 use a ranking process to determine the narrative data displayed in the narrative data summary 234. While FIG. 2C shows a textual narrative data summary 234a and an image-based narrative data summary 234b, the narrative data summary 234 may be a video or some other media, such as an animated GIF or FLASH content.

The displayed timeline units 230 may also include a social data summary 237, which identifies interactions between social networking system users and the narrative data used to generate the timeline units 230. For example, the social data summary 237 identifies the number of comments, "likes," views, shares, and/or other user interactions received by the narrative data in a timeline unit 230. The social data summary 237 may also display one or more comments provided by other social networking system users regarding the narrative data.

Additionally, the social data summary 237 may present additional information to page administrators an entity profile page. For example, the social data summary 237 displays statistics and analysis for user engagement with a timeline unit. The presented statistics and analysis may include a measure of the reach of the timeline unit, a measure of the amount of discussion related to the timeline unit by users, a measure of the virality or scope of user sharing of the timeline unit, and/or sentiment analysis of user comments and posts related to the timeline unit. The statistics and sentiment analysis may be used by page administrators to improve the experience of customers, fans, and users when interacting with a profile page. For example, a timeline unit 230 including content that is unpopular with users may be identified by a special highlight in the timeline interface displayed to page administrators to simplify removal of the timeline unit from the entity profile page. Similarly, a timeline unit 230 including content identified as popular and widely shared may be more prominently positioned on the entity page, such as by pinning or promoting the timeline unit 230. Various administrative actions such as hiding, removing, pinning, or promoting timeline units 230 may be simplified by displaying shortcuts associated with the actions positioned on or near the timeline units 230 in the timeline interface 200 displayed to profile page administrators.

The embodiment of the timeline 220 illustrated in FIG. 2C shows timeline units 230 ordered by time, flush against each other and with their timeline markers 235 and muted markers 236 spaced on the timeline 220 to be distinguishable from each other. In another embodiment, the timeline units 230, the markers 235, and the muted markers 236 are spaced on the timeline 220 by distances proportional to the actual time between the units. For example, if the displayed time period is the month of January and there are three timeline units 230 to display, one on January $1^{st}$, one on the $2^{nd}$, and one on the $30^{th}$, the timeline units 230 for January $1^{st}$ and January $2^{nd}$ are displayed flush against each other while the timeline unit 230 for January $30^{th}$ is displayed with a significant gap, corresponding to the space for the 27 days, between it and the timeline unit for January 2nd. In a different embodiment, the timeline units 230, the markers 235, and the muted markers 236 are spaced on the timeline 220 proportion to the actual time between the units, but the time scale of the timeline 220 is varied so that the scale is larger for time periods that have a greater density of timeline units and so that the scale is smaller for time periods that have a lower density of timeline units. For example, in the above example where there are three timeline units on January $1^{st}$, $2^{nd}$, and $30^{th}$, the space between the timeline unit on the $1^{st}$ and the $2^{nd}$ will be proportional to time, but the space between the timeline unit on the $2^{nd}$ and the $30^{th}$ may be compressed if there are no other timeline units between them.

The time period selector 210, one embodiment of which is illustrated in FIG. 2E, includes a chronologically ordered list of selectable time periods. In the embodiment shown by FIG. 2E, the time period selector 210 displays sections for the most recent three months (in FIG. 2E, "Now," "Last Month," and "July 2011"), and other sections corresponding to years. If the individual user or entity associated with the timeline 200 being viewed has many years of information, the years may be collected into decades that are displayed by the time period selector 210 with sections corresponding to recent years displayed in the time period selector 210. When a viewing user selects a time period from the time period selector 210, the timeline 220 scrolls (or refreshes) to show representations of timeline units 230 from the selected time period.

Selecting a time period may also cause the time period selector 210 to expand the selected time period into a selectable list of smaller sub-periods 251. In the example illustrated in FIG. 2E, selecting 2009 expands the year 2009 into a list of selectable months for the year 2009. The time period selector 210 may visually differentiate the selected time period from other time periods. Examples of visually differentiating the selected time period include displaying it using a bold font, underlining, color, size change, a sliding window, etc. The time period selector 210 may also similarly visually differentiate time periods that have more narrative data or more relevant narrative data. For example, if the month of July in 2009 has timeline units more relevant or more interesting to the viewing user, July 2009 may be highlighted with a special color in the time period selector 210. In addition, if a time period has more or more relevant timeline units, the portion of the timeline 220 corresponding to this time period may be visually distinguished to indicate that the period is more significant. The time periods with more or more relevant timeline units may also be further broken into finer grained sub-periods in the time period selector 210, to indicate the additional data or additional relevant data in these periods.

The timeline interface 200 may display a floating timeline header 252 at the top of the timeline 220. The timeline header 252 displays the name of the subject entity as well as the currently selected time period (e.g., in FIG. 2E it is 2009). The timeline header 252 may also include an add event shortcut menu 260, as illustrated in FIG. 2D. The add event shortcut menu 260 enables a page administrator to add structured data to the timeline 220 on an entity's profile page, effectively generating a user-created timeline unit. The add event shortcut menu 260 may allow a page administrator to select an event type 261 and present an event data entry interface 262 when an event type 261 is selected. The event data entry interface 262 is configured to capture data associated with the selected event type 261. When the administrator enters information into the event data entry interface 262 and provides a save command the data provided to the event data entry interface 262 is sent to the social networking system 100 to create new narrative data. If the structured data includes an event date, a timeline unit 180 associated with the structured data is generated by the timeline manager 119 for presentation on the timeline 220 at the provided date. In the example of FIG. 2D the page administrator administering its own profile page and has selected an event type for "Started a Job," so an event data entry interface 262 configured to capture data describing the "Started a Job" event is displayed. In this example, the event data entry interface 262 prompts the page administrator to enter employer, position, location, a photograph and a date range. Based on the information from the event data entry interface 262, the timeline manager 119 generates a "Started Work" timeline unit 263 for display on the page administrator's timeline. If the page administrator fails to provide some information (e.g., the user has not uploaded a photo as shown in FIG. 2D), the new timeline unit 263 may include a data inquiry shortcut interface 264 promoting for the missing data (in FIG. 2D, the data inquiry interface prompts the user to "+ Add a Photo").

The timeline interface 200 may allow an individual user to select from specified event types 261 such as starting a job, buying a house, getting a new roommate, buying a car, graduating, starting or ending military service, having a medical procedure, learning a language, travelling, etc. Entities (e.g., organizations, companies, bands, products, etc.) may select from entity-specific event types 261. For example, page administrators for band profile pages may be shown a customized add event shortcut menu 260 to create concert events, while page administrators for charity profile pages may be presented with a customized add event shortcut menu 260 to create fundraiser events. If a page administrator cannot find an event type 261 matching an event to be created, the page administrator may create a custom event type. The add event shortcut menu 260, or another similar interface, also allows page administrators and other users to add content, such as comments, photos, videos, etc., to a time in the past or future on the timeline 220. When users and page administrators add new content to the timeline 220, the timeline interface 200 may allow them to upload new content and/or to select content from narrative data that has already been captured by the social networking system 100.

The timeline units 180 generated by the timeline unit generator 120 may not be linked to a particular point on the timeline 220. Some timeline units 180 act as "reports" (referred to herein as "report timeline units") by aggregating content across a time period and presenting the viewing user with a summary of activity for the time period. FIG. 2B illustrates one embodiment of report timeline units 270. In FIG. 2B, four report timeline units 270a (for Photos), 270b (for Places), 270c (for Friends), and 270d (for Likes) are displayed. While the displayed report timeline units 270 are similar to the displayed timeline units 230, the report timeline units 270 are not associated with timeline markers 235 and may be separated from the other timeline units 230. For example a text marker 272 on the timeline 220 (in this example the text marker 272a is titled "reports") separates displayed report timeline units 270 from displayed timeline units 230. However, the report timeline units 270 may display a narrative data summary 234, similar to other timeline units 270. The timeline manager 119 may use a ranking process to determine the narrative data displayed in the narrative data summary 234. The narrative data summary 234 may vary based on the type of the displayed report timeline unit 270. For example, in FIG. 2B the Places report timeline unit 270b shows a map indicating locations of timeline units over the time period, while the Photos report timeline unit 270a shows thumbnails of uploaded photos over the time period. A displayed report timeline unit 270 may also include a dynamically updated statistic 271 that displays real-time or nearly real-time information about the content of the report timeline unit 270. For example, the Places report timeline unit 270b includes a dynamically updated statistic 271a indicating the number of user location check-ins in the current time period (4 check-ins in FIG. 2B). As another example, the Likes report timeline unit 270d includes a dynamically updated statistic 271b indicating the number of objects that the user has "liked" in the current time period (6 in FIG. 2B).

Text markers 272 may be placed on the timeline 220 to indicate transitions from one time period to the next. Accessing a text marker 272 may perform a function, such as revealing all muted timeline units in the time period. For example, in FIG. 2B text marker 272b marks the end of the 2011 time period, and accessing it reveals all timeline units in the 2011 time period.

Figure 2F:
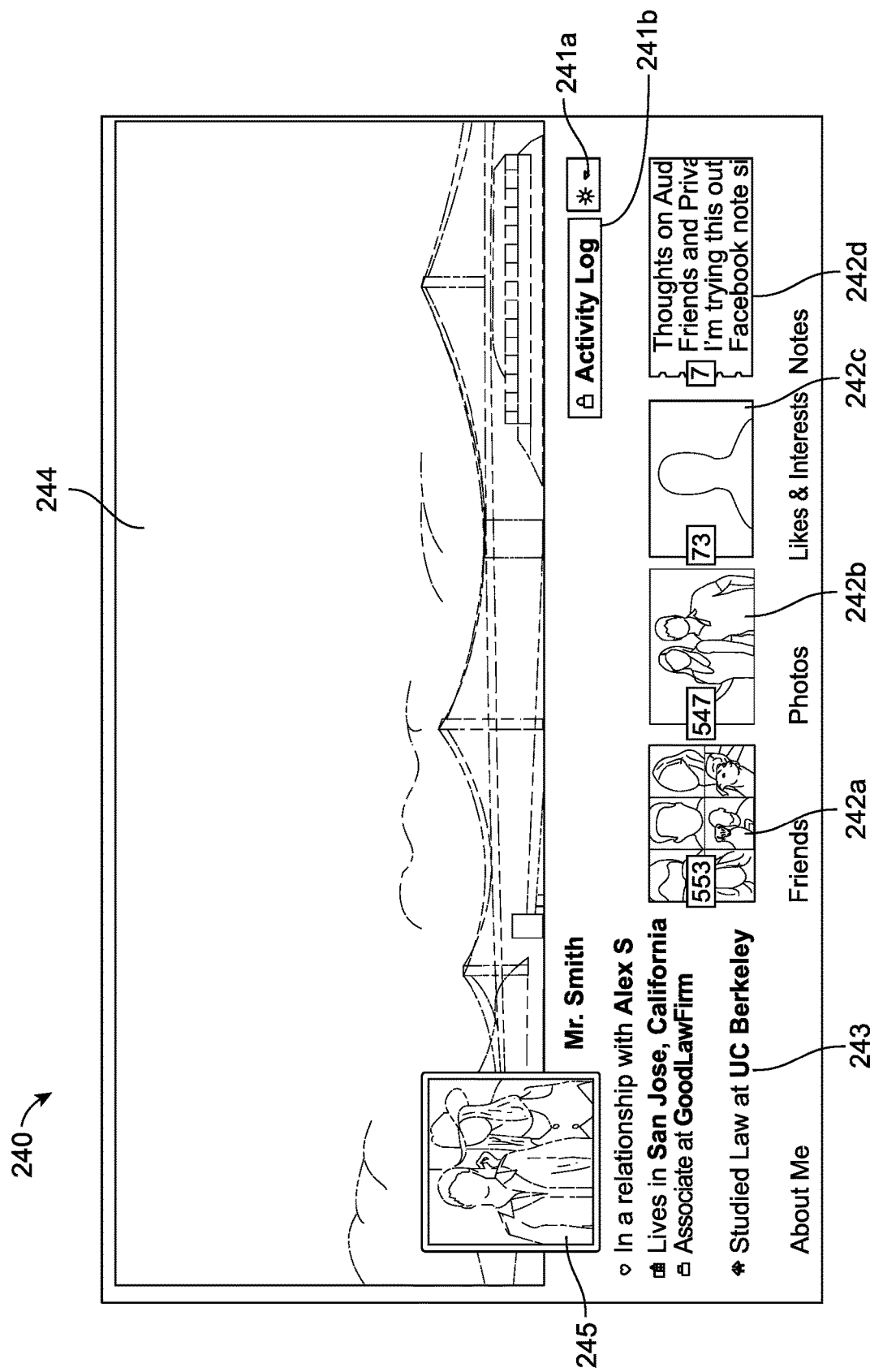
Figure 2G:
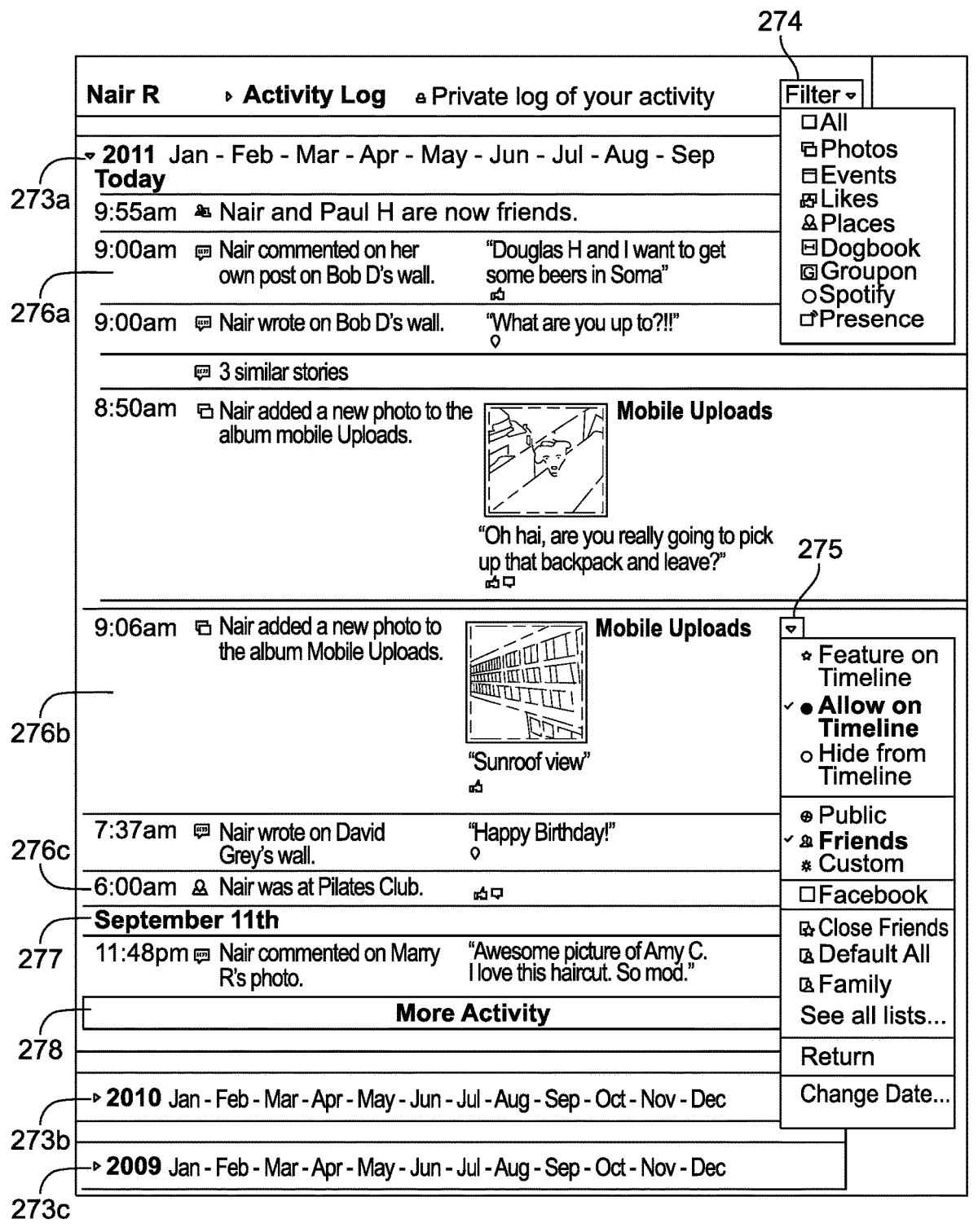
Figure 2H:
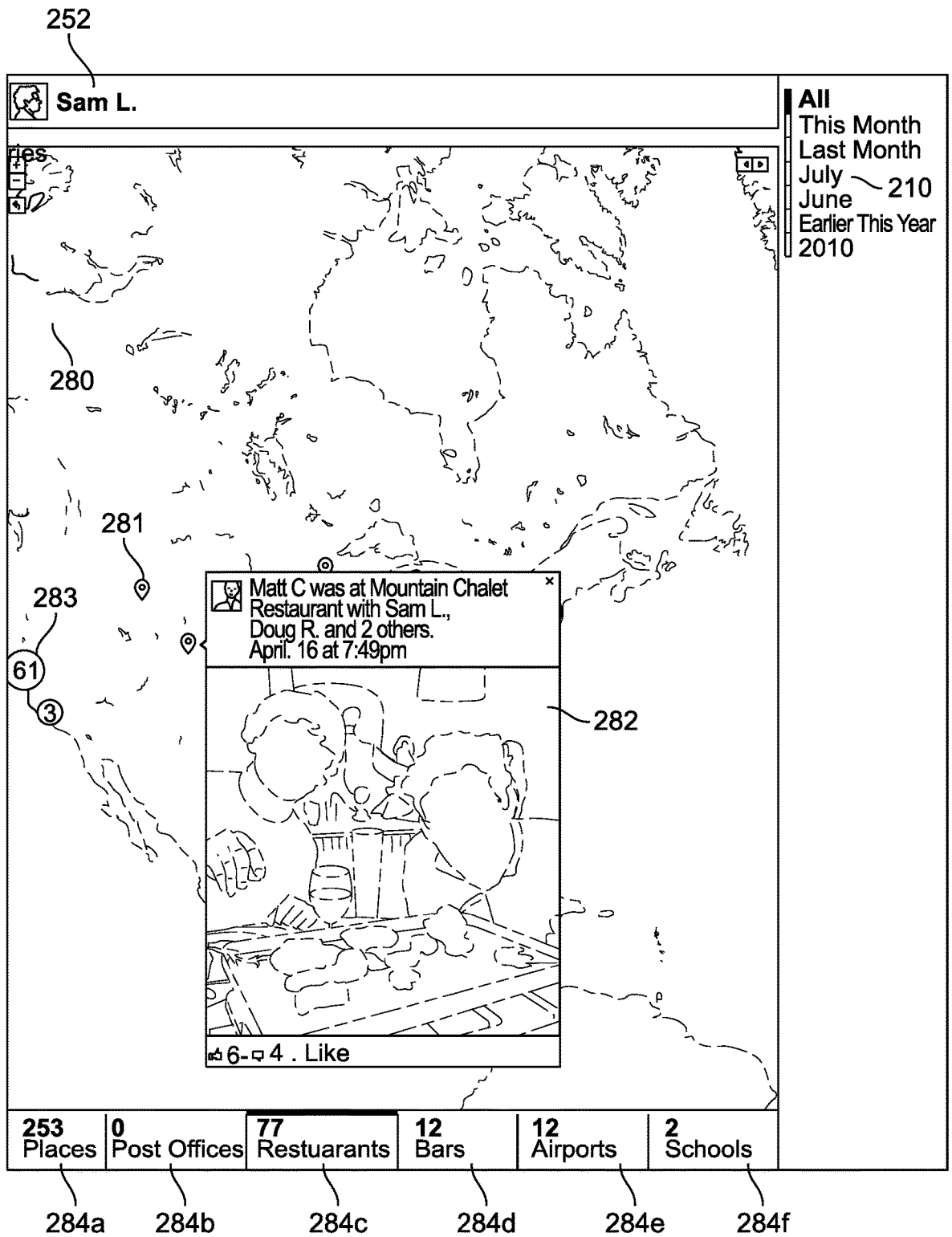

The title box 240 illustrated in FIG. 2F is an interface component including one or more of: option buttons 241, dynamic thumbnails 242, an entity details box 243, a dynamic cover photo 244 and a profile photo 245. The title box 240 allows page administrators to adjust a user's social networking system settings and customize the user's timeline. While FIG. 2F shows an individual user, the title box 240 also allows timeline and setting modification for entities such as companies, bands, musicians, organizations, brands, etc. The options and interface may be customized for different entity types.

The option buttons 241 allow page administrators to adjust various preferences associated with an entity's profile page, perform actions associated with the entity's profile page, and view and edit detailed feeds of information available to the page administrator. The options, actions and details available to a page administrator through the option buttons 241 may vary based on the type of entity, the permissions and authority of the page administrator, the privileges granted to the page administrator by the social networking system, etc. For page administrators of a profile page examples of option buttons include a settings button 241a that allows page administrators to adjust an entity's timeline settings, an activity log button 241b that allows administrators to access a list of activities associated with the entity on the social networking system 100, and an edit profile button that allows administrators to modify entity details such as the entity profile photo, cover photo, entity information etc. For viewing users, examples of option buttons 241 include buttons for messaging, "friending," "de-friending," "liking," muting, reporting, etc.

Accessing an activity log gives page administrators access to timeline units, activities and entity data that has been collected/generated by the social networking system 100 for an entity. The activity log may also enable administrators to identify individual timeline units, activities, or entity data to hide/show/maximize on the timeline 220. Hence, the activity log allows page administrators to curate an entity's narrative data for timeline presentation.

FIG. 2G illustrates one embodiment of an activity log accessible via the activity log button 241b. The activity log includes time period navigation headers 273 that indicate the time period for the displayed activities and enable administrators to retrieve activities of a specific date. The activity log also includes activity entries 276 displaying information about a particular activity captured by the social networking system 100. In one embodiment, the activity entries 276 include a time, a date, a text description of the action (e.g. "Jill added a comment"), and a thumbnail or other data summary. The activity log may also include date separators 277 separating the activities of one time period from another time period. A more activity link 278 allows the administrators to view additional activities from a particular time period only a subset of the activities from the time period are displayed. The activity filter 274 allows page administrators to filter the activity log. The filtering may be done based on activity type, users associated with the activity, sentiment analysis of the activity, time associated with the activity, or any other suitable criteria. For example, an administrator filters the activity log to show only photo-related activities, or to show activities related to a specific third-party social application.

Each activity entry 276 may also have an activity options shortcut menu 275 that enables page administrators to perform various functions relating to the activity. Examples of functions include hiding the activity from the entity profile page timeline, allowing the activity to be displayed on the profile page timeline, featuring the activity (starring) on the timeline, etc. These functions may be performed individually on activities or may be performed on groups of activities. Examples of groups of activities include activities grouped based on time, based on location, based on activity type, based on associated users or grouped based on other criteria. The activity options shortcut menu 275 may also allow a page administrator to set privacy options for an activity to restrict users capable of viewing the activity. Also the activity options shortcut menu 275 may enable a page administrator to change the date associated with an activity. For example, a page administrator may change the date of a photo from the date the photo was uploaded to a date associated with an event where the photo was taken. Similarly, the activity options shortcut menu 275 may enable administrators to associate a location with an activity or to modify a location associated with an activity.

The dynamic thumbnails 242, illustrated in FIG. 2F, are dynamic interface elements linking to various information about a user (e.g., an individual user or an entity) such as friends 242a, photos 242b, likes & interests 242c, and notes 242d. Dynamic thumbnails 242 may also be provided for third party application feeds, administrator-defined feeds, social group feeds, etc. The dynamic thumbnails 242 may be displayed in an order determined based on the viewing user's browsing history or preferences and/or based on the subject user's browsing history or preferences. A machine-learned ranking algorithm may also be used to determine the order of the dynamic thumbnails 242 based on user preferences, social signals, recent views, etc. The rating of a third-party application may be used as a factor that helps to determine that third-party application's dynamic thumbnail position in the list of dynamic thumbnails 242.

The dynamic thumbnails 242 allow viewing users to navigate to information about the subject user but also act as small windows into a user's data. Each dynamic thumbnail 242 displays a dynamic visual summary of the information to which it links. For example, the friends dynamic thumbnail 242a displays a small collage of profile photos of the user's connections, and may also display a numerical statistic showing the number of friends the entity has (in this case 553). Similarly, the photo dynamic thumbnail 242b shows a recent photo in which the subject user (an entity in this case) was tagged, as well as a statistic indicating the total number of photos in which the subject user was tagged (in this case 547).

The content in a dynamic thumbnail 242 and the statistics may change in real-time based on information collected by the social networking system 100. A ranking process, such as a machine-learned scoring/ranking process further described herein, may determine the data displayed by a dynamic thumbnail 242. Different types of dynamic thumbnails 242 may use a different ranking process to determine the displayed content. For example, the photos dynamic thumbnail 242a displays a collage including the entity's "best" photos based on a machine-learned algorithm's ranking of the entity's photos based on photo views, comments, likes etc. The ranking process may also account for the recency of photos to increase the ranking of new photos, making them more likely to be displayed in a dynamic thumbnail 242. As the page administrators and users post more photographs to the social networking system 100, the photos dynamic thumbnail 242a may update the displayed photos to include the newest photos posted.

By accessing a dynamic thumbnail 242 or another option, a viewing user may be presented alternative "views" of the timeline 220. These alternative views may be used to present viewing users with a timeline 220 including a particular type of timeline units. For example, a "Photo" view of the timeline 220 displays a timeline 220 including only timeline units having photos. Other views may present a viewing with view of the timeline 220 customized for a particular type of data.

In some embodiments, the profile page 201 includes an interface component customized based on the viewing user's social data. For example, the profile page 201 may include a friend activity interface displaying activities of users connected to the viewing user with respect to the profile page 201. For instance, on a band's profile page the friend activity interface displays a list of the band's songs that have been played by users connected to the viewing user. As another example, the friend activity interface displays a list of users connected to the viewing user that are attending an upcoming band concert. Hence, the friend activity interface may increase a viewing user's engagement with an entity by allowing the viewing user to easily view interactions with the profile page by users connected to the viewing user. Generation of a friend activity interface is further described below in conjunction with FIG. 6.

A profile page 201 may also include an administration console providing tools and information for the profile page administrators. In one embodiment, the administration console may include a suggestion interface recommending actions for a page administrator to take to improve user engagement with the entity profile page. The suggestion interface may also include an interface or shortcut allowing a page administrator to perform a recommended action. For example, the suggestion interface displays a message to a page administrator that the entity profile page is lacking a profile photo as well as a shortcut to upload a profile photo.

In some embodiments, the recommended actions or other data in the suggestion interface are based on user interaction with the profile page. For example, the suggestion interface identifies posts and messages from users that require action from a page administrator. Posts and messages requiring action by a page administrator may be identified by sentiment analysis of post or message content, by user reporting, by machine-learned models, by statistical analysis, or by any other suitable process. For example, the timeline manager 119 analyzes the type and/or content associated with an action to determine whether the action is indicative of a negative sentiment and identifies users associated with the actions indicating negative sentiment. The suggestion interface may display the actions indicating negative sentiment and suggest that a page administrator contact the actions associated with the posts. Examples of actions and/or content indicating negative sentiment may be inclusion of certain words or phrases in a post (e.g., "hate," "dislike," etc.), hiding a post, deleting a post or other actions indicating a dislike for an object.

Identifying posts and messages for page administrator action improves engagement of page visitors by allowing a page administrator to more efficiently address user actions. For example the suggestion interface allows a page administrator to resolve concerns by irate visitors (such as angry customers), remove offensive content (such as racist messages), provide feedback (such as answering fan messages) to users, and reward users (e.g. by giving active users access to special offers). The suggestion interface may allow page administrators to directly reply to identified posts or messages rather than have the page administrators manually identify the posts or messages. In one embodiment, the suggestion interface identifies users that have interacted with the profile page and that are influential users. The suggestion interface may further allow a page administrator to engage with and reward these influential users. Influential users may be identified based on the users' prior ability to influence the actions of other social networking system users to which they are connected.

FIG. 2H illustrates a "map view" of the timeline where a timeline map 280 replaces the timeline 220. The timeline map 280 includes a displayed map location and map markers 281 indicating the locations associated with timeline units in the currently displayed time period. When the viewing user interacts with a map marker 281 (for example by clicking it) a timeline unit pop-up 282 showing information about the timeline unit associated with the map marker 281 is displayed. In the example of FIG. 2H, the timeline unit pop-up 282 shows a picture from the timeline unit and social data about the number of comments and "likes" associated with the timeline unit. The timeline unit pop-up 282 may also allow a viewing user to comment on or "like" the timeline unit associated with the accessed map marker 281.

If more than one timeline unit 230 is associated with a map location or if the timeline map 280 is zoomed out so that timeline units with distinct locations overlap, multiple timeline units are shown using single map marker called a timeline map group marker 283. The timeline map group marker 283 displays a numerical indicator showing the number of timeline units at that location (e.g., 61 as shown in FIG. 2H). If a user modifies the scale of the timeline map 280 so the locations of the timeline units 230 no longer overlap, the timeline map group marker 283 is resolved into individual map markers 281 indicating the locations of the individual timeline units on the modified timeline map 280. Similarly if scale of the timeline map 280 is modified so the locations of the map markers 281 begin to overlap (e.g., the timeline map 280 is zoomed out), the map markers 281 are replaced by a single timeline map group marker 283 indicating the number of timeline units at that location. If the timeline map 280 is further zoomed out, multiple timeline map group markers 283 are combined into a single timeline map group marker 283. The scale of a timeline map group marker 283 may be modified to reflect the number of timeline units 230 it represents. In the example illustrated in FIG. 2H the timeline map group marker 283 associated with 63 timeline units larger than the timeline map group marker 283 associated with 3 timeline units. When a user clicks the timeline map group marker 283 a group pop-up may be displayed that is similar to the pop-up 282. The group pop-up may display the group of timeline units at the location of the timeline map group marker 283 or may display a single timeline unit from that location along with inputs allowing the viewing user to scroll between timeline units at the location.

In one embodiment, the timeline map 280 may present information to page administrators about social networking system users' interactions with a profile page. For example, the timeline map 280 displays map markers 281 indicating the locations associated with posts received users connected to an entity profile page. In another embodiment, the timeline map 280 displays map markers 281 identifying locations associated with users responding to invitations to an entity's event.

The timeline map 280 also includes one or more timeline filter tabs 284 allowing a viewing user to filter the timeline units 230 shown on the timeline map 280 based on various filtering criteria. For example, timeline filter tabs 284 allow a viewing user to filter the timeline units 230 shown based on timeline unit type. However, the timeline units may also be filtered by other criteria such as the users associated with the timeline units, the time associated with the timeline units, the location associated with the timeline units etc. In the illustrated example, each timeline filter tab 284 displays statistics identifying the number of timeline units in the current time period having a type identified by a timeline filter tab 284. In FIG. 2H, the "Places" tab 284a shows that there are 253 "places" timeline units in the currently selected time period. Filters based on other criteria may display other statistics. In one embodiment, viewing users may filter the timeline units to display only timeline units associated with their connections.

The timeline map 280 allows a user to change the currently viewed time period via the time period selector 210. This essentially filters timeline units 230 by time rather than by some other criteria. When a viewing user selects a different time period, the timeline map 280 shows map markers 281 for timeline units from the newly selected time period. Based on the locations of the timeline units 230 in the selected time period, the timeline map 280 may also scroll to a new location or center on a new location. The timeline map 280 may also include controls that allow a user to manually zoom, pan, and rotate the map view.

In one embodiment, the timeline map 280 presents a map view of a joint timeline for multiple subject entities (a "joint timeline map"). Generation of timeline units for a joint timeline is discussed in more detail herein. The timeline map 280 may process timeline units generated for multiple subject users similar to timeline units generated for one subject user. For a joint timeline map, the timeline filter tabs 284 may include a tab for each subject entity to allow the timeline map to be filtered based on subject entity. Additionally, the statistics displayed by each timeline filter tab 284 may be based on the number of timeline units related to a subject entity.

In one embodiment, a viewing user may create a new timeline unit 230 associated with a location by selecting the location on the timeline map 280 and entering data for the timeline unit associated with the location. For example, the timeline map 280 may open an event data entry interface 262 (as illustrated in FIG. 2D) when a user accesses a location on the timeline map 280. Entering data into the event data entry interface 262 communicates data for creating a timeline unit associated with the accessed location.

The timeline map 280 may show generic stories, which are further describe herein, instead of timeline units 230. When a timeline map 280 displays generic stories instead of timeline units, it may be called a "map view," a "story map" or just a map. A story map functions similarly to a timeline map 280, but the story map includes makers shown the locations of generic stories instead of timeline units, the filtering tabs filter the stories instead of timeline units, and the story map enables creation of new stories associated with locations instead of new timeline units.

The entity details box 243, illustrated in FIG. 2F, includes a summary of relevant information about a user. Examples of relevant information for an individual user include relationship status, employer, location, etc. Examples of relevant information for an entity include place of business, products, event dates, etc. Information included in the entity details box 242 may be explicitly provided by page administrators or it may be inferred from information maintained by the social networking system 100.

The dynamic cover photo 244, illustrated in FIG. 2F, includes an image selected by a page administrator to personalize a profile page 201. The dynamic cover photo 244 may have several render states, which may each be visually different. In one embodiment, the dynamic cover photo 244 has a maximized state where the entire image is visible and a minimized state where the image is partially visible (e.g., the picture may scroll up to occupy less of the screen). Different render states may be activated based on the identity of a viewing user, the viewing user's social networking history, the duration a render state has been active, the rating/relevancy of the dynamic cover photo content, the viewing user's screen size, or other factors. For example, the dynamic cover photo 244 is displayed in its maximized render state (or, full size) when a viewing user initially views the dynamic cover photo 244 and is displayed in a minimized render state when subsequently viewed by the viewing user.

In some embodiments, the image displayed in the dynamic cover photo 244 may shrink or expand to occupy the space available for the dynamic cover photo 244. As the display properties change, the image may change its scaling to fill the available area. For example, an image may be rescaled to fill an area displaying a dynamic cover photo 244 if the title box 240 depending on whether the dynamic cover photo 244 is displayed in either landscape or portrait mode on a mobile device. The dynamic cover photo 244 may include video content. This allows page administrators to place advertising video, concert footage, music videos, etc. directly in the profile page. If the dynamic cover photo 244 includes video content, the render states of the dynamic cover photo 244 may be related to whether the viewing user has previously watched the video before. For example, when a viewing user who has not seen the video content views the dynamic cover photo 244, the video may automatically play; however, if the viewing user has previously watched the video content, different content may be played, or the video may be replaced with a still image.

The profile photo 245 is selected by a page administrator and may be used as an image representation of the user associated with the profile page is used by the social networking system 100. For example, the profile photo 245 of an entity is displayed on the timeline interface 200 via the title box 240, and it may also be displayed on timeline units 230 including narrative data posted by page administrators associated with the entity.

In one embodiment, when a viewing user selects a previous time period to view, the profile photo 245, the entity details box 243, and/or the dynamic cover photo 244 are changed to reflect the subject user's historical data from the previous time period. For example, the profile photo 245 at the previous time period, the relationship status as the previous time period or other data associated with the entity at the previous time period.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The timeline interface 200 is sent via the network 310 to a client device 105 associated with the viewing user, where it is displayed via the user interface 130. If the viewing user selects a new time period from the time period selector 210, the timeline manager 119 selects or generates new timeline units associated with the newly selected time period. The new timeline units are sent to the viewing user's client device 105 for presentation in the timeline interface 200 at an appropriate position on the timeline 220.

In one embodiment, the timeline 220 is a single continuum including selectable time periods in chronological order. In this embodiment, selecting a time period from the time period selector 210 causes the timeline 220 to scroll to the selected time period in the continuum. In another embodiment, the timeline 220 shows only one time period at a time, and selecting a new time period from the time period selector 210 causes a new time period to be shown on the timeline 220.

The timeline manager 119 may select timeline units for presentation in the timeline 220 based on a timeline unit ranking generated for the subject user by the timeline unit ranker 125. In an embodiment, the timeline unit ranker 125 generates a timeline unit ranking for a viewing user. Alternatively, the timeline units selected by the timeline manager 119, which may be selected using a ranking produced by the timeline unit ranker 125, are curated by a page administrator, allowing the page administrator to customize the timeline units presented to viewing users. In some embodiments, the viewing user may curate the subject user's timeline 220 to reflect the viewing user's content preferences. Timeline units selected for presentation in a selected time period are included in the timeline 220 presented by the timeline interface 200 to the viewing users. For example, if Bob views a timeline 220 for a band, the social networking system 100 may allow Bob to hide and show timeline units on the band's timeline; Bob's curation data may be stored by the social networking system 100 to subsequently show Bob the band's timeline with timeline units selected based on Bob's preferences. In one embodiment, page administrators reorder or remove timeline units from the timeline unit ranking.

The timeline manager 119 may highlight has timeline units 230 selected for presentation in the timeline 220 based on their ranking. For example, the timeline manager 119 may more prominently display highly ranked timeline units 230 compared to timeline units 230 ranked lower. Higher ranked timeline units 230 may be emphasized, relative to lower ranked timeline units 230, by being displayed using a larger size, an outline, a different text color, a different font, a different text size, a different background color or other suitable visual differentiation. An example of this visual differentiation is the "starred" displayed timeline unit 230c of FIG. 2C, which is displayed with double the width of other displayed timeline units 230.

For a given time period, the timeline manager 119 may display only a subset of the available timeline units 230 to limit the crowding of the timeline 220. If a subset of timeline units 230 are displayed, the timeline manager 119 selects the timeline units for display based on page administrator or viewing user curation and/or ranking, or some other methodology.

Timeline Unit Curation

The social networking system 100 may allow page administrators and viewing users to curate narrative data, including the data objects 175 in the data store 350 and the actions 181 in the action log 351. As curators, administrators and/or viewing users may highlight narrative data they like and/or remove or hide narrative data they dislike. To enable curation, the user interface manager 115 allows curators to hide or remove visual representations of timeline units through the user interface 130, which hides or removes the corresponding timeline units. While the timeline interface 200 may allow individual removal of unwanted timeline units, such as the "hide from timeline" option in the timeline unit shortcut menu 232b illustrated in FIG. 2B, the user interface 130 may also provide another interface to allow curators to indicate unwanted timeline units 230 either individually or collectively by action category, by data type, by actor, or by some other attribute associated with timeline units 230. The timeline interface 200 may also give curators the ability to indicate that a timeline unit 230 is important to them so that the indicated timeline unit 230 is preferred over other timeline units 230. The timeline interface 200 may allow individual marking of visual representations of timeline units as "important" or "liked," such as the "star" shortcut button 231b or a "pin" button. The user interface 130 may provide another interface to allow curators to individually or collectively indicate preferred timeline units.

The timeline manager 119 may limit curation of timeline units displayed on an entity's timeline 220 to page administrators. Alternatively, the timeline manager 119 may allow viewing users to curate their view of an entity's timeline 220. In some embodiments, the timeline manager 119 allows page administrators and viewing users to curate an entity's timeline 220. In a different embodiment, the timeline manager 119 does not allow curation and selects timeline units based on other criteria (including or excluding the ranking information from the timeline unit ranker 125).

Timeline Unit Generation and Ranking

Figure 4:
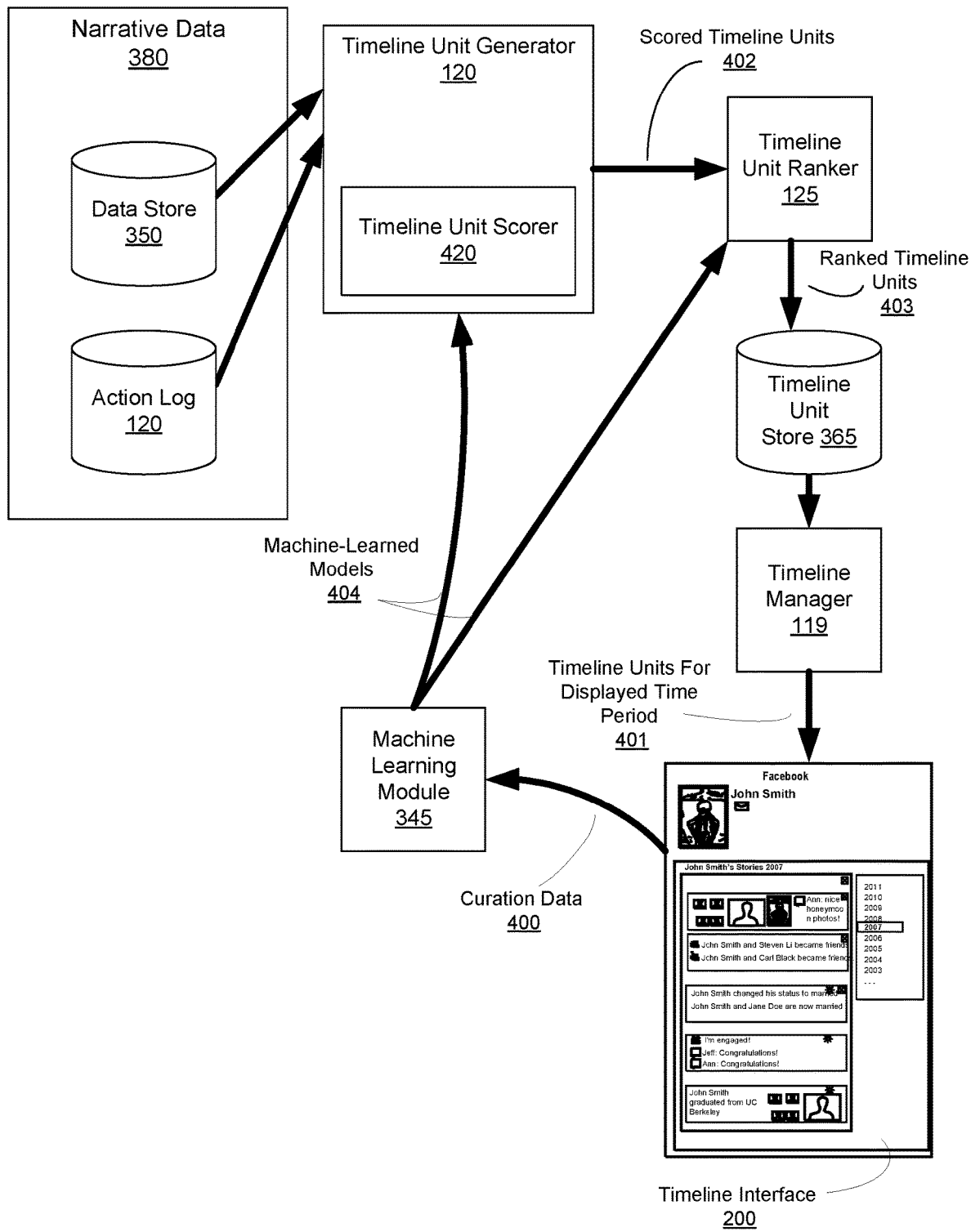
FIG. 4 is a data flow diagram illustrating generation and ranking of timeline units, in accordance with an embodiment of the invention.

FIG. 4 illustrates one embodiment of a process for generating and ranking timeline units in a social networking system 100. In this embodiment, the timeline unit generator 120 uses narrative data to generate timeline units 180 for display in a timeline 220. Each timeline unit includes information about the narrative data represented by a timeline unit and may also include a score generated by a timeline unit scorer 420. In one embodiment, the timeline unit generator 120 generates a quantity of timeline to fill each time period on the timeline 220. In another embodiment, the timeline unit generator 120 generates more timeline units than used to fill each time period on the timeline 220, so additional timeline units are readily available if a downstream process—such as a privacy process—hides one or more timeline units from the timeline 220.

When generating timeline units for a particular time period, the timeline unit generator 120 may select narrative data based on page administrator preferences and generates timeline units for the selected narrative data. In another embodiment, the narrative data used to generate timeline units is selected. Alternatively, both viewing user and page administrator preferences are used to select narrative data for timeline unit generation.

The timeline unit generator 120 may select narrative data items based on social networking data such as user "likes" of an item, number of comments on the item, views of the item, affinity of a page administrator or viewing user for the item, etc. Additionally, selection of narrative data may also account for the time period for which the timeline unit is being generated. For example, a photo associated with a time in a time period in which the subject entity does not have many other photos may be more likely to be selected than a similar photo from a time period associated with many photos. Selection of narrative data may also take into account the preferences of the page administrators and/or the viewing user.

In an embodiment, the timeline unit generator 120 uses machine-learned models—generated by the machine-learning module 345—to select narrative data. In another embodiment, the timeline unit generator 120 selects narrative data using a rule-based system that is based on manually specified rules. In yet another embodiment, the timeline unit generator 120 selects narrative data for generating timeline units based on feedback (such as through curation) from the page administrators and/or the viewing users. The timeline unit generator 120 may also use any combination of the above mentioned techniques to select narrative data for generating timeline units. In another embodiment, the timeline unit generator 120 generates timeline units for a particular time period using all the narrative data associated with the time period, without accounting for relevance.

In one embodiment, the timeline unit generator 120 generates timeline units associated with a single user by selecting only narrative data that is related to that single user. For example, photos associated with a single user, posts about the single user, events associated with the single user or other narrative data associated with the single user. Timeline units generated from the selected narrative data is used to generate a timeline for the entity.

In another embodiment, the timeline unit generator 120 generates shared timeline units, or shared stories, associated with a subject user as well as other users connected to the viewing user by selecting narrative data related to both the subject entity and one or more of the viewing user and users connected to the viewing user. These shared timeline units or stories may be displayed in the friend activity section of a profile page. For example, if the subject user is a band, timeline units or stories are generated that include photos of users connected to a viewing user that are at the band's concerts, songs of the band played by the users connected to the viewing user or other suitable data. The shared timeline units or stories may be used to generate a common timeline, news feed, or friend activity panel including narrative data of the subject entity that is related to the viewing user or to users connected to the viewing user. Systems and methods for displaying an intersection between entities of a social networking system are disclosed in U.S. application Ser. No. 13/087,672, filed on Apr. 15, 2011, which is hereby incorporated by reference in its entirety.

The generated timeline units may have different types based on their included content and/or their informational purpose. In one embodiment, some timeline units are configured to display information describing a particular event. For example, there may be distinct event timeline unit types for displaying information about job changes, concerts, trips, weddings, birthdays, film viewings etc. Some timeline units may be configured to display aggregate groups including data having various types. For example, there may be timeline unit types for aggregating photos, videos, or music from a particular time period or event (e.g., a photo report for a concert event). Other timeline units may describe actions performed on with social networking system users. For example, timeline unit types may display information about the connections made with a user in a particular time period, such as users connecting to an entity in a particular time period.

Different timeline unit types arrange data in a manner that is informative to the viewing user. Because timeline units are configured to give a summary of the narrative data from when they are generated, a timeline unit representation may display a subset of the narrative data used to generate the timeline unit. A visual representation of a timeline unit may display information summary elements that present users with a compact and informative summary of narrative data. Examples of information summary elements include image thumbnails (which act as image summaries), text extracts (which act as textual comment summaries), frame captures and GIF animations (which act as video summaries), statistical summaries (numbers that provide information on the narrative data), etc. Information summary elements may be generated from narrative data most relevant to a viewing user to provide the viewing user with the most compelling summaries. For example, a timeline unit is generated for a photo album that includes information summary elements displaying thumbnails of the three most popular photos in photo album and number indicating the number of photos in the album.

Information summary elements may be updated dynamically as the underlying narrative data changes. The visual representations of the timeline units may also include navigation aids allowing users to conveniently obtain more information about specific narrative data. Examples of navigation aids include web links, tabs, and buttons. An element in a visual representation of a timeline unit may be both an information summary element and a navigation aid. For example, the visual representation of a timeline unit includes a set of photo thumbnails representing images from a subject user's photo album, where each thumbnail is also a link that may be accessed to navigate to the photo album itself and to view other photos in the album.

The timeline unit scorer 420 produces a score for each generated timeline unit that corresponds to the importance of a timeline unit to the subject user and/or to a viewing user. The importance of a timeline unit to a subject user may be determined by the preferences and curation of the entity's page administrators. In one embodiment, the timeline unit scorer 420 uses machine-learned models, produced by the machine-learning module 345, to produce the score for each generated timeline unit. The machine-learned models may use machine-learning techniques to evaluate timeline units against other timeline units of similar type. For example, timeline units including photos are compared against other timeline units containing photos, rather than against timeline units including links and/or text. To evaluate the relevance of timeline units, the machine-learned models may use various features of the narrative data represented in the timeline units. Examples of features for evaluating the relevance of timeline units include social data signals such as user "likes" (e.g. activation of a thumbs-up or like button), user comments, user tags, user views, user affinity etc., but may also include other signals such as image features, video features, textual features, etc.

The scored timeline units 402 outputted by the timeline unit generator 120 are processed by the timeline unit ranker 125 to produce a ranking of timeline units. To produce a unified ranking including timeline units of different types, the timeline unit ranker 125 normalizes scores across different timeline unit types. The normalization process may weight certain timeline unit types to increase or decrease their rank. For example, the social networking system 100 may give additional weight to timeline units including photos while reducing the weight of timeline units that predominantly include text because viewers often prefer photos over text. The weightings and the details of the normalization process may be adjusted based on the needs of the social networking system 100. For example, the normalization process may be configured for a particular user (e.g., a specific entity) or a specific demographic to account for tastes and preferences. In one embodiment, the timeline unit ranker 125 uses machine-learned models produced by the machine-learning module 345 to determine the appropriate weighting for each timeline unit type. To weight each timeline unit type, the machine-learned models may look at various features and social data signals associated with these timeline unit types. Examples of features and signals include user "likes," user comments, user views, user affinity etc., and may also include features from narrative data included in timeline unit types. The timeline ranker 125 creates a ranking based on the normalized scores. The ranked timeline units 403 may be stored in the timeline unit store 365, or may be selected by the timeline manager 119 for display in the timeline 220 in the timeline interface 200.

In one embodiment, the timeline unit ranker 125 may attempt to remove duplicate narrative data appearing in multiple timeline units (de-duplication) from the ranked timeline units 403. For example, when the timeline unit ranker 125 detects two timeline units including the same narrative data, the timeline unit ranker 125 removes the timeline unit with the lower score. This prevents the same narrative content from being presented in multiple timeline units.

As another example, when the timeline unit ranker 125 detects two timeline units including the same narrative data, the timeline unit ranker 125 removes only the duplicated narrative data from the timeline unit with the lower score. Removal of the duplicated narrative data may cause the timeline unit ranker 125 to further analyze the timeline unit from which the duplicated narrative data is removed to determine if removal of the duplicated narrative data renders the timeline unit "uninteresting" or invalid. For example, if a timeline unit includes a single photo and a comment about the photo, removing the comment may not make the timeline unit uninteresting, as users are likely to view photos without comments. However, removing the photo may render the timeline unit uninteresting as a comment about a photo is unlikely to be interesting without the photo itself.

In one embodiment, the timeline unit ranker 125 implements a diversification process to ensure inclusion of diverse timeline unit types in the timeline 220. Such a diversification process prevents a single timeline 220 from being filled with an excess of a single timeline unit type. For example, without a diversification process, it is possible that the top ten timeline units for a time period are predominantly photo timeline units, creating a timeline 220 displaying mostly photos and little other content. Accordingly, the timeline unit ranker 125 may use a variety of methods to diversify the types of timeline units selected by the timeline manager 119. One method allows selection of a certain number of each timeline unit type for display in a time period. Another method negatively weights timeline units of a type once a specified number of timeline units of the same type have been selected for display in a time period. In one embodiment, the diversification process may be performed when the timeline units are ranked and stored in the timeline unit store 365. Diversification may also be varied based on the demographic of the viewing user, the subject user, or both.

In one embodiment, the timeline manager 119 allows viewing users to select particular "views" of the timeline 220 that are biased to show many more of one type of timeline unit or to exclusively show one type of timeline unit. The timeline manager 119 provide the particular "views" by weighting the score of timeline units of a particular type so that the particular type of timeline units are selected for display. For example, if a user selects a "Photos" view of the timeline 220, the timeline manager 119 increases the scores of timeline units including photos relative to other types of timeline units, so that the timeline units with photos are displayed on the timeline 220.

Machine-Learning Module

The machine-learning module 345 generates machine-learned models 404 used by the timeline unit scorer 420 and the timeline unit generator 120, the timeline unit ranker 125 and for ranking content for relevance by various components of the timeline interface. For example, the machine-learned models 404 may be used by the timeline manager 119 to determine photos displayed in a Photo report for a particular time period. Examples of machine-learned models 404 include tree-based models, kernel methods, neural networks, splines, and combinations of one or more of these techniques. The machine-learning module 345 may also use other machine-learned methods or statistical methods to generate models.

In one embodiment, the machine-learning module 345 uses curation data 400 retrieved from the timeline interface 200 to improve machine-learned models 404 used by other modules. The curation data 400 may include the explicit preference data as well as implicitly collected social data. Examples of explicit preference data include data about which timeline units have been hidden, muted, deleted, starred, liked or promoted by page administrators. Examples of implicitly collected social data include information about which timeline units have been viewed, expanded, linked, commented, shared, etc. The curation data 400 may be used as training data to improve machine-learned models by the machine-learning module 345 for use by other modules. For example, the timeline unit ranker 125 uses a trained machine-learned model 404 from the machine-learning module 345 to weight timeline units of various types during the score normalization process. Another trained machine-learned model 404 may be used by the timeline unit scorer 420 to generate timeline unit scores. Yet another trained machine-learned model 404 may be used by the timeline unit generator 120 to select narrative data for generating timeline units.

The machine-learning module 345 may generate a single set of machine-learned models 404 capturing the preferences of the entire user base of the social networking system 100. Alternatively, the machine-learning module 345 may generate separate sets of machine-learned models 404 for subsets of the user base of the social networking system 100 (e.g., a different set of models for users in different age ranges). The machine-learning module 345 may also generate a distinct set of machine-learned models capturing preferences of individual social networking system users.

Timeline Unit Generation Process

Figure 5A:
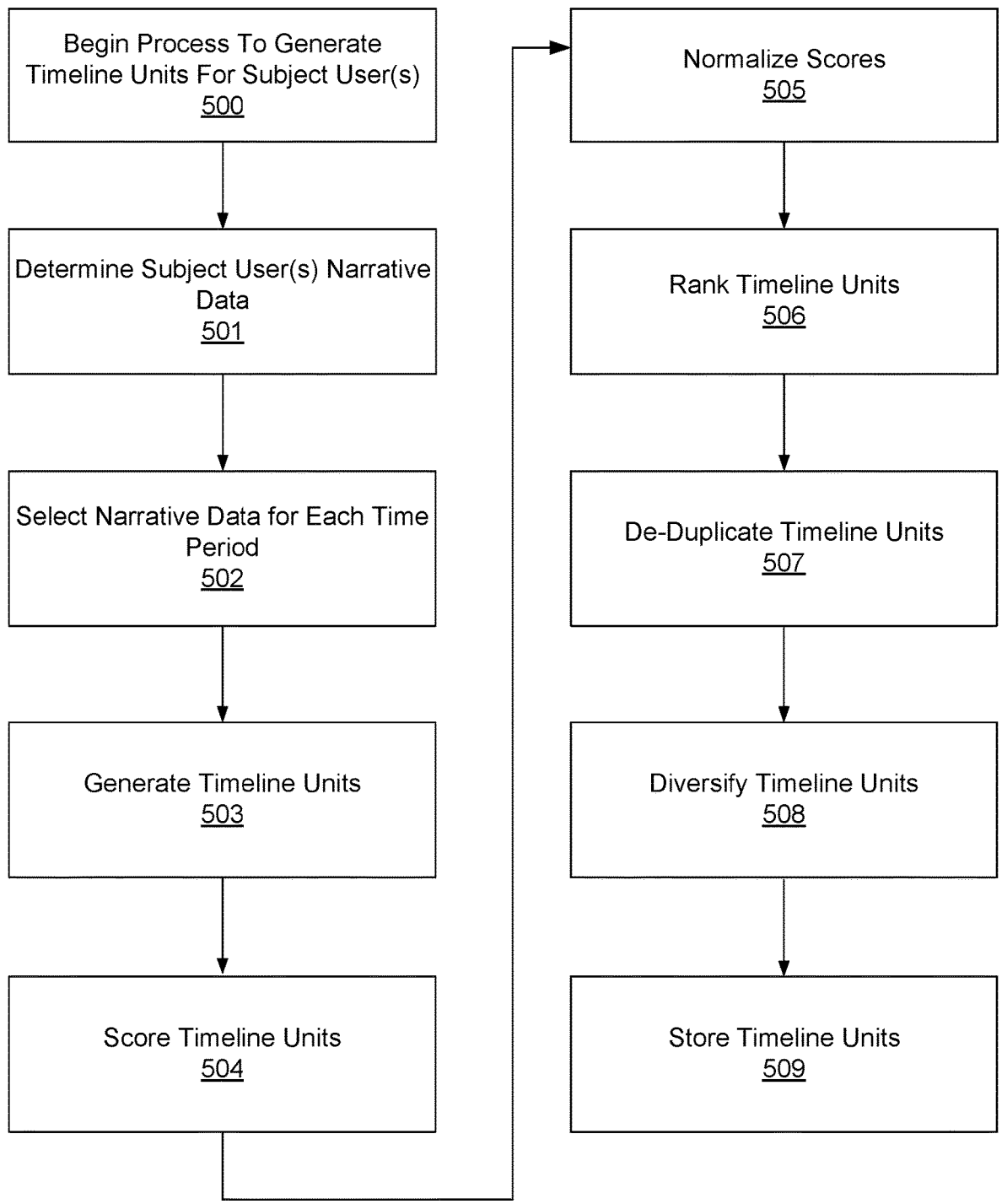
FIG. 5A illustrates a process for generating and ranking timeline units, in accordance with an embodiment of the invention.
Figure 5B:
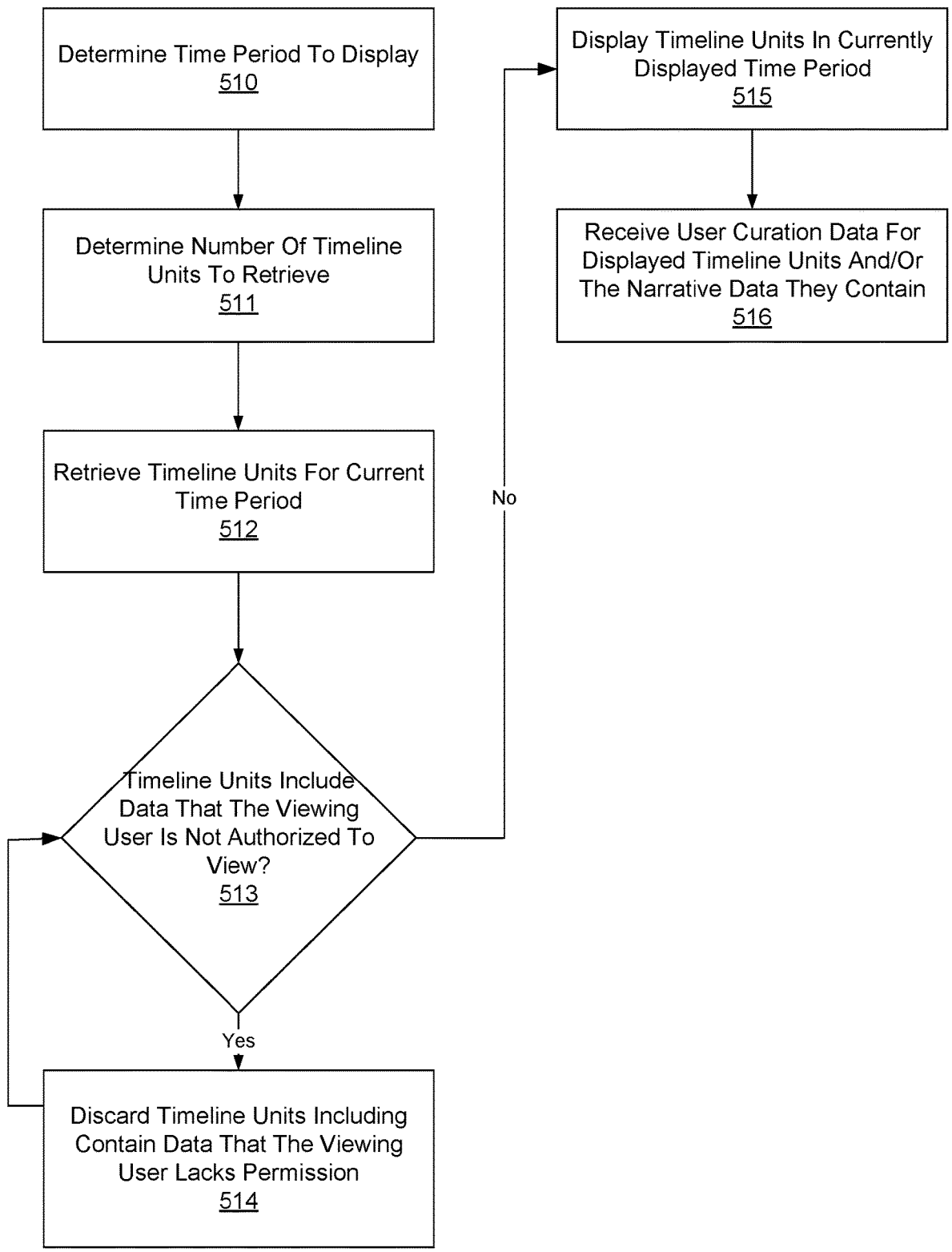
FIG. 5B illustrates a process for generating timeline units and collecting user curation data, in accordance with an embodiment of the invention.

FIG. 5A and FIG. 5B illustrate one embodiment of a process for generating, ranking, and displaying timeline units in a social networking system 100. The social networking system begins 500 the process for generating timeline units for a subject user, such as an entity. The process may be periodically initiated to continuously generate new and updated timeline units for social networking system users, or it may be initiated in response to an event, such as a request by a viewing user to access the timeline of a subject user. During the process, the timeline unit generator 120 determines 501 narrative data related to the subject users. The relevant narrative data may have previously been associated with the subject user in a database, or it may be discovered by processing actions and data in the action log 351 and data store 350 for connections between the subject user and various data. For example, a photo is determined to be relevant to a subject user based upon a caption associated with the photo including the subject user's name. Similarly, actions where the subject user is one of the actors may also be determined 501 to be relevant narrative data.

Once the narrative data is identified, the timeline unit generator 120 selects 502 narrative data for one or more time periods. Selection of narrative data may be performed by a machine-learned model, as described above, or it may be performed by another method. In some embodiments, curation data, from later stages in the process, may be used by the machine-learned models to improve narrative data selection 502. Narrative data may be selected 502 for timeline unit generation based on a score generated for each item of narrative data. In one embodiment, narrative data is scored using machine-learned models in a manner similar to the scoring described above for timeline units.

In one embodiment, the timeline manager 119 accounts for privacy settings of the subject user and the viewing user when selecting 502 items of narrative data for presentation to the viewing user. Items of narrative data the viewing user does not have permission to view are not selected 502. Alternatively, privacy settings are not applied when selecting 502 narrative data, but are later applied when selecting generated timeline units.

Timeline units are generated 503 from the selected narrative data and scored 504 based on the selected narrative data. Machine-learned models may be used to score 504 timeline units. The models may be the same as those used to select 502 the narrative data or they may be separate models. The scores associated with the timeline units are normalized 505 based on timeline unit type, as described above. Normalization may weight certain timeline unit types to increase their subsequent ranking and/or likelihood of subsequent selection. A machine-learned model may be used to weight the each timeline unit types for normalization.

The normalized timeline units are then ranked 506 by score and de-duplicated 507 to remove duplicate narrative data. De-duplication may remove a lower ranked timeline unit with duplicate data or removing duplicate narrative data from a lower ranked timeline unit while preserving the lower ranked timeline unit itself. In one embodiment, a timeline unit is re-scored after duplicate narrative data is removed.

In one embodiment, the ranked timeline units are diversified 508 after de-duplication. Diversification ensures that a variety of timeline unit types are included in the ranking for each time period. Timeline units may be diversified 508 in a variety of ways. After ranking 506 and de-duplication 506, timeline units may be diversified 508 by reducing the scores of timeline units having a timeline unit type associated with more than a threshold number of timeline units in a time period and increasing the scores of timeline units having a timeline unit type associated with less than a threshold number of timeline units in a time period. In the embodiment illustrated in FIG. 5A, timeline units are stored 509 after diversification for display at a later time. Alternatively, the timeline units are selected for display after diversification without being stored.

In a different embodiment, the timeline units are diversified 508 when the timeline units are retrieved for display in a particular time period. For example, timeline units monitored when selected from the timeline unit store 365 to identify timeline unit types previously selected from the timeline unit store 365 and different timeline unit types are selected as described above. Diversification during timeline unit retrieval is particularly beneficial for selecting timeline units time periods with user-defined durations.

FIG. 5B illustrates one embodiment of a process for retrieving and displaying timeline units in a social networking system 100. Timeline units are retrieved and displayed when a viewing user requests a timeline interface for a subject user. The timeline manager 119 determines 510 the time period to display. A timeline interface may include a variety of graphical user interfaces allowing viewing users to specify the time period for data to be viewed. In one embodiment, the timeline interface presents the viewing user with of predetermined time periods from which a time period is selected. In another embodiment, a viewing user may specify a time period's starting time and ending time. If the viewing user does not select a time period for display, the timeline manager 119 may determine 510 the time to display using one or more default criteria. For example, the timeline manager 119 displays the most recent time period if no time period is specified.

After determining 510 the time period to display, the timeline manager determines 511 the number of timeline units to retrieve. The timeline manager 119 may determine 511 the number based on the available space in the timeline 220. Based on the determined number of timeline units, the timeline manager 119 retrieves 512 timeline units for display. The timeline manager 119 determines 513 if one or more of the retrieved 512 timeline units include narrative data that the viewing user is not authorized to view. The subject user's privacy settings and the relationship between the viewing user and the subject user determine whether the viewing user is authorized to view various timeline units. If the subject entity limits access to some narrative data as "friends only" and if the viewing user connected subject entity, the viewing user is not authorized to view timeline units including the limited-access narrative data. If the timeline manager 119 determines 513 that the viewing user is not authorized to view one or more timeline units, those timeline units are discarded 514 and replacement timeline units are retrieved from the timeline unit store 365 by the timeline manager 119. If the viewing user has limited viewing authorization, there may not be enough timeline units for display in a time period and the timeline manager 119 may leave a portion of the time period display empty request additional timeline units from the timeline unit generator 120.

Selected timeline units may be sent to a client device 105 of the viewing user or converted into displayable representations, as described above, with the displayable representations sent to the client device 105 of the viewing user along with other elements of the timeline interface to be displayed 515. In one embodiment, the timeline interface, including the selected timeline units as part of the subject user's profile page. The timeline manager 119 may receive 516 curation data from the viewing user's client device 105 describing the viewing user's interaction with the displayed timeline units and/or the narrative data. Examples of curation data include click-through on the narrative data, moving of the timeline units, hiding of the timeline units, marking of timeline units through "stars," "pins," "buttons," etc., and other user feedback mechanisms commonly used in user interfaces. Curation data may be collected from one or more of page administrators and viewing users.

Stories and Newsfeeds

Timeline units are a specific type of a more general social network story aggregation. A social network story (or "story") is an aggregation of data gathered by the social networking system 100 that is configured for display in various views. For example, stories may be presented to viewing users in a continuously updated real-time newsfeed in a web browser, displayed in a timeline view (i.e. timeline units in the timeline interface), displayed through a map view or displayed in any suitable manner.

Story generation is a more generalized form of timeline unit generation. In one embodiment, the social networking system 100 includes different types of story generators configured to generate stories for different purposes (i.e., different views). A story generator selects narrative data and generates stories using templates to configure the look and behavior of the generated stories. Story generators are configured to generate stories for a particular view and may restrict the selection of narrative data used to generate stories based on a specific view. For example, a story generator is configured to generate stories for a map view of "check-ins," so the story generator limits selection of narrative data to data having the type "location check-ins." In another example, a story generator is configured to generate stories for a photo album view, so the story generator limits selection of narrative data to data including or referencing images. The timeline unit generator 120 may be considered a special type of story generator configured to generate stories suitable for display on a timeline interface.

Generation of stories for newsfeed views and historical newsfeed views is another example of story generation. A newsfeed is a scrollable list of recent stories relevant to the viewing user that is updated in real-time. A historical newsfeed is a newsfeed for a prior time period that is reconstructed using stories from the prior time period rather than the current time period. Multiple story generators for different types may be used to produce stories of different types that are displayed in newsfeeds and historical newsfeeds. For example, the stories for a newsfeed or for a historical newsfeed are displayed together in a scrollable list. Generating stories for a newsfeed from data captured by a social networking system are disclosed in U.S. application Ser. No. 11/503,037, filed on Aug. 11, 2006, and U.S. application Ser.

No. 11/502,757, filed on Aug. 11, 2006, which are hereby incorporated by reference in their entirety.

Figure 6:
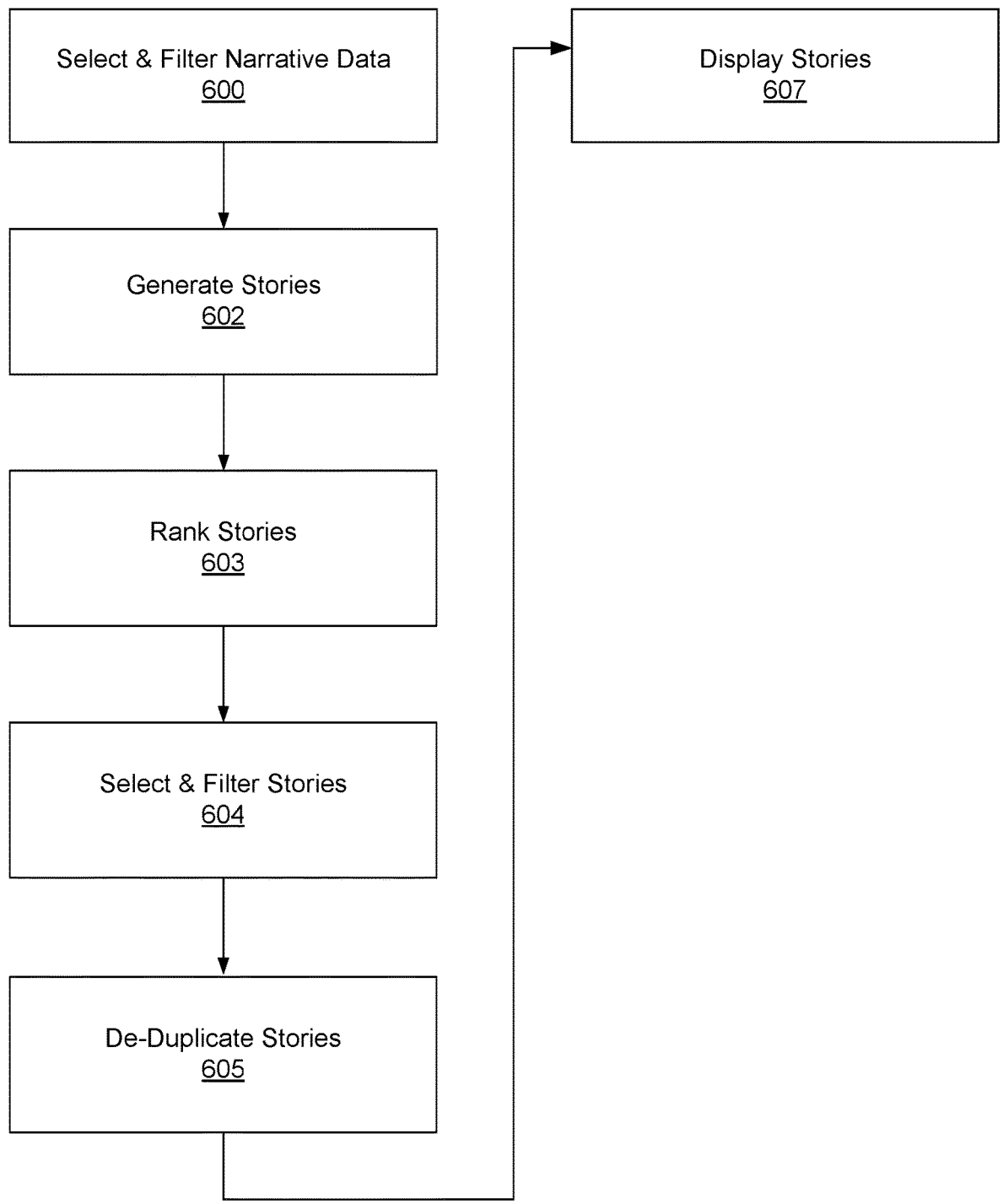
FIG. 6 illustrates a process for generating, selecting and displaying newsfeeds and historical newsfeeds, in accordance with an embodiment of the invention.

FIG. 6 illustrates one embodiment of the story generation, selection, and display process for newsfeeds and historical newsfeeds. One or more story generators select and filter 600 narrative data for story generation. For newsfeeds, selection of narrative data may be based on the viewing user for which the newsfeed is being generated. In one embodiment, the story generators select all narrative data associated with the viewing user and with other users directly connected to the viewing user (e.g., friends, relatives, co-workers, etc.). In another embodiment the story generators may use one or more filters to select only certain narrative data satisfying particular criteria. For example, a filter may be used to limit selection of narrative data to data for which the viewing user has the highest affinity scores. A ranking process may also be used to select relevant narrative data. In another example, a filter may be used to remove narrative data that the viewing user has previously viewed in the past, limiting story generation to using unviewed narrative data. Similarly, the newsfeed may use a filter to restrict selection of narrative data to data captured within a specified time interval (e.g., narrative data captured in the last day, or week). In another embodiment, a filter is used to limit narrative data selection to data related to a subject user and to users connected to the viewing user. Narrative data related to a subject user and to one or more users connected to the viewing user may be used to generate stories displayed in a friend activity interface on a profile page.

A story generator may also filter narrative data based on its type. For example, an "event" story generator may select only narrative data that is associated with an event, while a photo story generator may select only narrative data including images. In one embodiment, story generators filter selection of narrative data based on privacy settings of the subject entities associated with narrative data. If page administrators do not give a viewing user permission to view a certain piece of narrative data, story generators do not consider the piece of narrative data for story generation. In other embodiments, privacy settings are applied later in the process as described herein.

Selecting and filtering narrative data for generating stories for a historical newsfeed is similar to selecting and filtering narrative data for generating stories for a newsfeed. However, a story generator for a historical newsfeed may filter narrative data based on the viewing user's current affinity scores for narrative data or the viewing user's historical affinity scores for narrative data from the time period for which the historical newsfeed is being generated. In addition, for a historical newsfeed narrative data is filtered to select data associated with the time period for which the historical newsfeed is being generated.

The story generators apply templates to the selected narrative data to generate 602 candidate stories. The templates include information describing presentation of the narrative data for display in the stories. Templates may define a particular layout or arrangement of data and may also define particular user interfaces or behaviors for the stories, based on the purpose of the stories. This is analogous to the timeline unit generation process, described above, where narrative data is arranged in different ways for different user interfaces using timeline units of different types. Similarly, stories in newsfeeds and in historical newsfeeds may have different types, which have different user interfaces and arrangements.

The candidate stories may be stored in a database for rapid retrieval. In one embodiment, a story is stored in a database as a list of references to narrative data along with additional information called the story metadata. The presentation and behavior of the story when displayed on a client device 105 is defined by the story metadata.

Each candidate story may also be associated with a unique hash or identifier. The hash or identifier is generated based on the story generator type and the story metadata. A unique hash or identifier enables the social networking system 100 to easily track the stories with which a viewing user interacted. Tracking the viewing user's interaction with stories improves selection of stories for the viewing user by adjusting the viewing user's affinity scores for the narrative data in the stories with which the user interacted. In some embodiments, a story may be regenerated as new narrative data is captured by the social networking system 100, allowing the story to be updated to include the newly captured narrative data. Because a story's hash value is based on the story generator type and the story generator, a regenerated story retains its original hash value even though its narrative data is modified. This enables the social networking system 100 to continue tracking stories even as their displayed narrative data changes.

The candidate stories are ranked 603 to determine their relative relevance to the viewing user. Ranking of candidate stories may be based on the viewing user's affinity scores for the stories or for the narrative data that the stories reference. The ranking may also account for the viewing user's interaction history with the stories directly or by modifying the affinity scores for narrative data associated with stories with which the viewing user interacted. The ranking may also be generated using a machine-learned model, as described above regarding ranking timeline units. Stories generated for a historical newsfeed may be ranked based on the viewing user's current affinity scores or based on the viewing user's historical affinity scores from the time period for which the historical newsfeed is being generated.

Based on the ranking, top stories are selected and filtered 604. The social networking system 100 may enforce various policies when filtering the selected top stories by removing stories that do not meet certain criteria. For example, privacy settings of the subject entities are associated with the narrative data referenced in the stories are applied. In this example, stories including narrative data that a viewing user is not authorized to view are removed from the selected top stories. Filtering may also be used to diversify the stories in the newsfeed and historical newsfeed. Diversification of stories is similar to diversification of timeline units, which is described above in conjunction with FIG. 5. For example, the ranking of stories having story types that have limited representation at the top of the ranking is increased while the ranking of stories having story types having excessive representation at the top of the ranking.

In one embodiment, the selected top stories are de-duplicated 605, which is described above with respect to timeline units in conjunction with FIG. 5. During de-duplication, duplicate narrative data is removed by filtering out lower ranked stories including redundant narrative data entirely or by removing redundant narrative data from lower ranked stories.

After de-duplicatation, the selected top stories are sent to the viewing user's client device 105 for display 607 in a newsfeed or in a historical newsfeed. In one embodiment, a visual representation of the story is sent rather than the story. The visual representation may be generated by accessing narrative data referenced by a story and configuring a visual representation of the narrative data using the story metadata.

The newsfeeds and historical newsfeeds may have variations differing from the embodiment described above. While the above-described embodiment refers to newsfeeds and historical newsfeeds using narrative data associated with the viewing user or any user connected to the viewing user, in other embodiments the selected narrative data is associated with a single subject user, which may also be the viewing user. In this embodiment, the affinity scores of the subject user, instead of the viewing user, may be used to determine the relevance of the narrative data and/or stories. The timeline 220 described herein is a variation of this latter embodiment using timeline units as an implementation of the generic story. In another variation, stories generated for a newsfeed or historical newsfeed may be presented as part of a "map view," which plots stories on a map based on location. This "map view" is analogous to the timeline map 280 described herein and may use a similar interface.

SUMMARY

In some embodiments, the modules of the social networking system 100 are not contained within a single networking system but are found across several such systems. The social networking system 100 may communicate with the other systems, for example, using APIs. In these embodiments, some modules shown in FIG. 3 may run in the social networking system 100, whereas other modules may run in the other systems. For example, in one embodiment the data store 350 and action log 351, may run on some external networked database system outside the social networking system 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request for a profile page of a subject entity from a client device, wherein the subject entity is not an individual person and is associated with a viewing user of a communication network, the viewing user also an administrator of information about the subject entity, the profile page divided into a plurality of sections and including a timeline that is partially comprised of a plurality of timeline units;
   selecting a plurality of items of narrative data stored by the communication network, each item of the narrative data associated with the subject entity;
   generating a plurality of social network stories based on the selected plurality of items of narrative data;
   selecting a plurality of the generated social network stories to be displayed as the plurality of timeline units of the timeline in a suggestion interface of the profile page;
   performing a sentiment analysis of content of the timeline units;
   determining, by the communication network based on user interactions with the timeline and the sentiment analysis, a recommended action for the administrator to take on the suggestion interface to improve user engagement with the profile page, the recommended action allowing the administrator to pin one or more of the plurality of timeline units to a position on the profile page;
   generating the suggestion interface for the profile page of the subject entity, the suggestion interface including the timeline comprising the plurality of timeline units displaying each of the selected plurality of generated social network stories, a timeline unit having a shortcut for the administrator to perform the recommended action;
   receiving, from the administrator, a selection of the shortcut to perform the recommended action; and
   pinning the one or more of the plurality of timeline units to the position on the profile page according to the recommended action.

2. The method of claim 1, further comprising:
generating a descriptive message associated with the recommended action, the descriptive message displayed with the shortcut in the suggestion interface on the timeline unit.

3. The method of claim 1, wherein the sentiment analysis is based on actions of users of the communication network.

4. The method of claim 1, wherein the sentiment analysis is based on feedback from users different from the viewing user.

5. A non-transitory computer-readable medium having instructions that, when executed by a processor, cause the processor to perform steps comprising:
receiving a request for a profile page of a subject entity from a client device, wherein the subject entity is not an individual person and is associated with a viewing user of a communication network, the viewing user also an administrator of information about the subject entity, the profile page divided into a plurality of sections and including a timeline that is partially comprised of a plurality of timeline units;
selecting a plurality of items of narrative data stored by the communication network, each item of the narrative data associated with the subject entity;
generating a plurality of social network stories based on the selected plurality of items of narrative data;
selecting a plurality of the generated social network stories to be displayed as the plurality of timeline units of the timeline in a suggestion interface of the profile page;
determining, by the communication network based on user interactions with the timeline and a sentiment analysis, a recommended action for the administrator to take on a timeline unit of the plurality of timeline units in the suggestion interface to improve user engagement with the profile page, the recommended action allowing the administrator to pin one or more of the plurality of timeline units and to a position on the profile page;
generating the suggestion interface for the profile page of the subject entity, the suggestion interface including the timeline comprising the plurality of timeline units displaying each of the selected plurality of generated social network stories, a timeline unit having a shortcut for the administrator to perform the recommended action;
receiving, from the administrator, a selection of the shortcut to perform the recommended action; and
pinning the one or more of the plurality of timeline units to the position on the profile page according to the recommended action.

6. The non-transitory computer-readable medium of claim 5, the steps further comprising:
generating a descriptive message associated with the recommended action, the descriptive message displayed with the shortcut in the suggestion interface on the timeline unit.

7. The non-transitory computer-readable medium of claim 5, wherein the sentiment analysis is based on actions of users of the communication network.

8. The non-transitory computer-readable medium of claim 5, wherein the sentiment analysis is based on feedback from users different from the viewing user.

* * * * *